(12) United States Patent
Tamura et al.

(10) Patent No.: US 8,685,885 B2
(45) Date of Patent: Apr. 1, 2014

(54) HONEYCOMB STRUCTURE

(75) Inventors: Seiji Tamura, Ibi-gun (JP); Masaya Sato, Ibi-gun (JP); Shigeaki Goto, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 74 days.

(21) Appl. No.: 13/090,262

(22) Filed: Apr. 20, 2011

(65) Prior Publication Data

US 2011/0263419 A1    Oct. 27, 2011

(30) Foreign Application Priority Data

Apr. 22, 2010   (WO) .................. PCT/JP2010/057184

(51) Int. Cl.
*B01J 23/02*    (2006.01)
*B32B 3/12*    (2006.01)

(52) U.S. Cl.
USPC ............ 502/439; 428/116; 428/117; 428/118

(58) Field of Classification Search
USPC .................................. 502/439; 428/116–118
See application file for complete search history.

(56) References Cited

U.S. PATENT DOCUMENTS

| 2004/0161596 | A1 | 8/2004 | Taoka et al. | |
|---|---|---|---|---|
| 2006/0019061 | A1 | 1/2006 | Oshimi | |
| 2008/0160250 | A1 | 7/2008 | Adler et al. | |
| 2008/0236394 | A1* | 10/2008 | Ohno et al. | 96/9 |
| 2009/0239028 | A1* | 9/2009 | Ohno et al. | 428/116 |

FOREIGN PATENT DOCUMENTS

| EP | 1741891 | 1/2007 |
|---|---|---|
| EP | 1961930 | 8/2008 |
| EP | 1977810 | 10/2008 |
| EP | 2062636 | 5/2009 |
| JP | 2003-201823 | 7/2003 |
| JP | 2004-154718 | 6/2004 |
| JP | 2008-179526 | 8/2008 |
| WO | WO 02/096827 | 12/2002 |
| WO | WO 2008/126335 | 10/2008 |

OTHER PUBLICATIONS

International Search Report for corresponding International Application No. PCT/JP2010/057184, Jul. 20, 2010.

\* cited by examiner

*Primary Examiner* — Anthony J Zimmer
(74) *Attorney, Agent, or Firm* — Ditthavong Mori & Steiner, P.C.

(57) ABSTRACT

A honeycomb structure includes a ceramic block including honeycomb fired bodies. The honeycomb fired bodies include an assembly including a plurality of substantially quadrangular-cross-section units which are combined with one another with an adhesive layer interposed between the plurality of substantially quadrangular-cross-section units. A peripheral face of the assembly of substantially quadrangular-cross-section units has a concave portion and a convex portion formed in a substantially step-shaped pattern. At least one substantially triangular-cross-section unit has an outer wall on a periphery portion of the at least one substantially triangular-cross-section unit. The at least one substantially triangular-cross-section unit is fit in the concave portion with the adhesive layer interposed between the at least one substantially triangular-cross-section unit and the concave portion. A sealing material layer is provided on a peripheral face of the ceramic block. The sealing material layer has partially different thickness.

25 Claims, 19 Drawing Sheets

A-A line cross-sectional view

910

911a  911b

920

921a  921b

960

961a  961b

970

971a  971b 1010, 1011b, 1011a 1020, 1021b, 1021a 1060, 1061a, 1061b 1070, 1071b, 1071a

A-A line cross-sectional view

B-B line cross-sectional view

C-C line cross-sectional view

D-D line cross-sectional view

E-E line cross-sectional view

F-F line cross-sectional view

G-G line cross-sectional view

H-H line cross-sectional view

I-I line cross-sectional view

HONEYCOMB STRUCTURE

CROSS-REFERENCE TO RELATED APPLICATIONS

The present application claims priority under 35 U.S.C. §119 to International Application No. PCT/JP2010/057184 filed on Apr. 22, 2010, the contents of which are incorporated herein by reference in their entirety.

BACKGROUND OF THE INVENTION

1. Field of the Invention

The present invention relates to a honeycomb structure.

2. Discussion of the Background

In recent years, particulate matters (hereinafter, also referred to simply as PMs) in exhaust gases that are discharged from internal combustion engines for vehicles and construction machines and the like have raised problems as contaminants harmful to the environment and the human body.

In order to solve those problems, as an exhaust gas purifying device for purifying exhaust gas by capturing PMs in exhaust gas, there have been proposed, for example, various exhaust gas purifying apparatus using a honeycomb structure as a structural element.

The honeycomb structure of this kind is made of, for example, porous ceramic such as silicon carbide, and includes a large number of cells which are placed in parallel with one another with a cell wall interposed therebetween, inside thereof from one end to the other end along the longitudinal direction of the honeycomb structure. Further, one of the ends of each of the cells is sealed with a plug material.

With this structure, exhaust gas flows into cells that open on the exhaust gas inlet side and passes through a cell wall separating adjacent cells and then flows out through cells that open on the exhaust gas outlet side. As a result, PMs in the exhaust gas are captured in the cell wall.

At a timing when a predetermined amount of PMs has accumulated and the pressure loss reaches a certain value, the honeycomb structure is heated for regenerating process. As a result, the accumulated PMs are burned so that the PM capturing ability of the honeycomb structure is recovered.

With regard to the honeycomb structure of this kind, there has been a demand in these days for a large size honeycomb structure capable of capturing a large amount of PMs to be mounted in large scale diesel engines for heavy vehicles such as buses and trucks, agricultural machinery, construction machinery, ships and vessels, locomotives, and the like.

An example of the honeycomb structure designed for large scale models includes a honeycomb structure formed of a ceramic block in which a plurality of honeycomb fired bodies made of porous ceramics such as silicon carbide are combined with an adhesive layer interposed therebetween, and a sealing material layer formed on the periphery face of the ceramic block (for example, JP-A-2008-179526).

The contents of JP-A-2008-179526 are incorporated herein by reference in their entirety.

SUMMARY OF THE INVENTION

According to one aspect of the present invention, a honeycomb structure includes a ceramic block and a sealing material layer. The ceramic block includes a plurality of honeycomb fired bodies and an adhesive layer. The plurality of honeycomb fired bodies each have cell walls extending along a longitudinal direction of the plurality of honeycomb fired bodies to define cells. The plurality of honeycomb fired bodies includes an assembly and at least one substantially triangular-cross-section unit. The assembly includes a plurality of substantially quadrangular-cross-section units. The plurality of substantially quadrangular-cross-section units are combined with one another with the adhesive layer interposed between the plurality of substantially quadrangular-cross-section units. The plurality of substantially quadrangular-cross-section units each have a substantially quadrangular shape in a cross section perpendicular to the longitudinal direction. A peripheral face of the assembly of substantially quadrangular-cross-section units has a concave portion and a convex portion formed in a substantially step-shaped pattern. The at least one substantially triangular-cross-section unit has a substantially triangle shape in the cross section perpendicular to the longitudinal direction and has an outer wall on a periphery portion of the at least one substantially triangular-cross-section unit. The at least one substantially triangular-cross-section unit is fit in the concave portion with the adhesive layer interposed between the at least one substantially triangular-cross-section unit and the concave portion. The adhesive layer is interposed between the plurality of honeycomb fired bodies to combine the plurality of honeycomb fired bodies. The sealing material layer is provided on a peripheral face of the ceramic block. The sealing material layer has partially different thickness.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
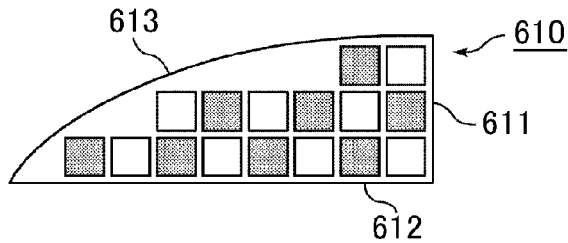
FIG. 1A, FIG. 1B, FIG. 1C, FIG. 1D, and FIG. 1E are side views each schematically illustrating one example of the irregular-cross-section unit according to the honeycomb structure of the embodiment of the present invention.

The embodiments will now be described with reference to the accompanying drawings, wherein like reference numerals designate corresponding or identical elements throughout the various drawings.

In manufacturing the conventional honeycomb structure disclosed in JP-A-2008-179526, first a rectangular pillar-shaped ceramic block is manufactured by combining a plurality of honeycomb fired bodies with an adhesive layer interposed therebetween. Then, cutting is performed on the peripheral face of the ceramic block to provide a round pillar-shaped ceramic block. Next, a sealing material layer is formed on the peripheral face of the ceramic block.

Accordingly, a round pillar-shaped honeycomb structure is manufactured.

However, the cut ceramic portion generated by cutting is wasted. Further, the cutting takes a long time to cut the peripheral face of the hard ceramic block made of such materials as silicon carbide.

Those factors tend to cause problems of low productivity and high production cost of the honeycomb structure.

In particular, the larger the size of the honeycomb structure to be manufactured is, the more the amount of the portion to be cut increases, and this tendency is significant.

The honeycomb structure of embodiments of the present invention is a honeycomb structure including: a ceramic block formed by a plurality of honeycomb fired bodies combined with one another with an adhesive layer interposed therebetween, each of the honeycomb fired bodies having a large number of cells placed in parallel with one another in a longitudinal direction with a cell wall therebetween; and a sealing material layer formed on a peripheral face of the ceramic block, wherein the ceramic block includes: an assembly of substantially quadrangular-cross-section units in which a plurality of the substantially quadrangular-cross-section units each having a substantially quadrangular shape in the cross section perpendicular to the longitudinal direction are combined with one another with the adhesive layer interposed therebetween; and a substantially triangular-cross-section unit having a substantially triangular shape in the cross section perpendicular to the longitudinal direction and having an outer wall on the periphery portion thereof, a peripheral face of the assembly of substantially quadrangular-cross-section units has a concave portion and a convex portion formed in a substantially step-shaped pattern, the substantially triangular-cross-section unit is fit in the concave portion with the adhesive layer interposed therebetween, and the sealing material layer has partially different thickness.

In production of the honeycomb structure of embodiments of the present invention, cutting process for cutting the peripheral face of the ceramic block is not necessary, and thus low production cost can be easily achieved.

In the ceramic block in which the substantially triangular-cross-section unit is fit by interposing the adhesive layer in the concave portion of the assembly of substantially quadrangular-cross-section units, the assembly having the concave portion and the convex portion formed in a substantially step-shaped pattern on the peripheral face thereof, the irregularity formed by the concave portion and the convex portion is filled with the substantially triangular-cross-section units. As a result, the shape of the ceramic block becomes more like a polygonal pillar similar to a substantially round pillar, a substantially pillar shape with a race track end face, a substantially cylindroid shape, a pillar of a substantially triangular shape whose apexes have a curved shape, and the like as compared with the assembly of substantially quadrangular-cross-section units.

In the honeycomb structure of embodiments of the present invention, it is preferable that: the concave portion includes a first side surface of a first substantially quadrangular-cross-section unit and a second side surface of a second substantially quadrangular-cross-section unit; the first side surface and a first side surface of the substantially triangular-cross-section unit contact each other with the adhesive layer interposed therebetween; the second side surface and a second side surface of the substantially triangular-cross-section unit contact each other with the adhesive layer interposed therebetween; and a third side surface of the substantially triangular-cross-section unit does not contact any of the side surfaces of the substantially quadrangular-cross-section unit.

The honeycomb structure having the foregoing structure can also enjoy the effects of the embodiment of the present invention easily.

In the honeycomb structure of embodiments of the present invention, it is preferable that: the substantially quadrangular-cross-section unit has a substantially square cross-sectional shape; the substantially triangular-cross-section unit has a substantially right triangular cross-sectional shape substantially corresponding to a shape obtained by substantially dividing the substantially quadrangular-cross-section unit with a plain surface which includes diagonal lines of a first end face and a second end face of the substantially quadrangular-cross-section unit; and the third side surface of the substantially triangular-cross-section unit includes the hypotenuse of the substantially right triangular shape.

The ceramic block of the honeycomb structure having the foregoing structure is more likely to have a polygonal pillar shape which is more similar to a substantially round pillar shape, a substantially pillar shape with a race track end face, a substantially cylindroid shape, a pillar of a substantially triangular shape whose apexes have a curved shape, and the like. Thus, the honeycomb structure can preferably enjoy the effects of the embodiment of the present invention easily.

The substantially square cross-sectional shape used herein means that the shape (cross-sectional shape) of a cross section of the substantially quadrangular-cross-section unit perpendicular to the longitudinal direction thereof is a substantially square shape. The substantially right triangular-cross-sectional shape used herein means that the shape (cross-sectional shape) of a cross section of the substantially triangular-cross-section unit perpendicular to the longitudinal direction thereof is a substantially right-triangular shape.

In the honeycomb structure of the embodiments of the present invention, it is preferable that: the honeycomb fired body further includes an irregular-cross-section unit; the irregular-cross-section unit has a shape including at least a first side, a second side forming a substantially right angle with the first side, and a inclined line facing the substantially right angle in the cross section perpendicular to the longitudinal direction; an outer wall is formed on the periphery portion of the irregular-cross-section unit; and the side surface including the inclined lines forms the peripheral face of the ceramic block.

In this case, more preferably, the side surface of the irregular-cross-section unit including the second side contacts the substantially triangular-cross-section unit with the adhesive layer interposed therebetween.

In the honeycomb structure having the structure of this kind, the shape of the ceramic block is more likely to be a polygonal shape which is more similar to a substantially round pillar shape, a substantially pillar shape with a race track end face, a substantially cylindroid shape, a pillar of a substantially triangular shape whose apexes have a curved shape, and the like. Thus, the honeycomb structure can further preferably enjoy the effects of the embodiment of the present invention easily.

In the honeycomb structure of embodiments of the present invention, the ratio of the thickness of the thickest part of the sealing material layer to the thickness of the thinnest part of the sealing material layer is preferably from about 20:about 1 to about 5:about 3.

In the case that the ratio of the thickness of the thickest part of the sealing material layer to the thickness of the thinnest part of the sealing material layer is from about 20:about 1 to about 5:about 3, the PM-capturing efficiency tends to be increased and the thermal stress can be more easily reduced sufficiently during regenerating process.

In the honeycomb structure of embodiments of the present invention, the thickness of the thickest part of the sealing material layer is preferably from about 5.0 mm to about 10.0 mm, and the thickness of the thinnest part of the sealing material layer is preferably from about 0.5 mm to about 3.0 mm.

In the case that the thickness of the thickest part of the sealing material layer is from about 5.0 mm to about 10.0 mm, and the thickness of the thinnest part of the sealing material layer is from about 0.5 mm to about 3.0 mm, the PM-capturing efficiency tends to be increased and the thermal can be more easily reduced sufficiently during regenerating process.

In the honeycomb structure of embodiments of the present invention, the number of the honeycomb fired bodies is preferably 25 pieces or more.

The honeycomb structure of embodiments of the present invention preferably has a substantially round shape in the cross-section perpendicular to the longitudinal direction and has a diameter of about 190 mm or more.

The honeycomb structure of this kind is a large size honeycomb structure suitable for use in a large size diesel engine, and this structure makes it possible to especially preferably enjoy the effects of the embodiment of the present invention easily.

According to the honeycomb structure of embodiments of the present invention, the shape of the cross section of the ceramic block perpendicular to the longitudinal direction is preferably a substantially octagonal shape, or the shape of the cross section of the ceramic block perpendicular to the longitudinal direction is preferably a substantially tricontadigonal shape.

In the honeycomb structure of embodiments of the present invention having the structure of this kind, the ceramic block has a shape more similar to a substantially round pillar shape, a substantially pillar shape with a race track end face, a substantially cylindroid shape, a pillar of a substantially triangular shape whose apexes have a curved shape, and the like. Therefore, the honeycomb structure can preferably enjoy the effects of the embodiment of the present invention easily.

In the honeycomb structure of embodiments of the present invention, the shape of the cross section of each of the large number of cells perpendicular to the longitudinal direction is preferably a substantially quadrangular shape.

In the honeycomb structure of embodiments of the present invention, the large number of cells preferably include a large-capacity cell and a small-capacity cell. Preferably, the cross sectional area of each of the large-capacity cells perpendicular to the longitudinal direction is larger than the cross sectional area of each of the small-capacity cells perpendicular to the longitudinal direction.

The large-capacity cell used herein refers to the cell having the largest cross sectional area perpendicular to the longitudinal direction among the plurality of cells formed in the honeycomb structure (honeycomb fired body). The small-capacity cell used herein refers to the cell having the smallest cross sectional area perpendicular to the longitudinal direction among the plurality of cells formed in the honeycomb structure (honeycomb fired body).

Meanwhile, the large-capacity cell and the small-capacity cell are determined among basic cells having specific cross-sectional shapes (basic patterns).

The basic cells refer to the smallest unit of cells having the same shape or different shapes which are repeatedly formed vertically and horizontally when the cells constituting a honeycomb fired body are observed in a cross section perpendicular to the longitudinal direction.

The basic cells may be repetition of a smallest unit of cells having different cell cross-sectional areas in combination. In this case, the cells having different cell cross-sectional areas in combination are the basic cells.

The large-capacity cells and the small-capacity cells are explained below based on the concept of the basic cells.

For example, in a honeycomb fired body 610 illustrated in FIG. 1A, which is to be described below, a cross section perpendicular to the longitudinal direction of the fired body 610 includes a plurality of sequential cells each having a substantially square shape. Those cells each having a substantially square cross-sectional shape are basic cells. In the honeycomb fired body, the cross-sectional areas of all the basic cells are the same. Therefore, the honeycomb fired body does not correspond to a honeycomb structure having large-capacity cells and small-capacity cells.

Figure 2A:
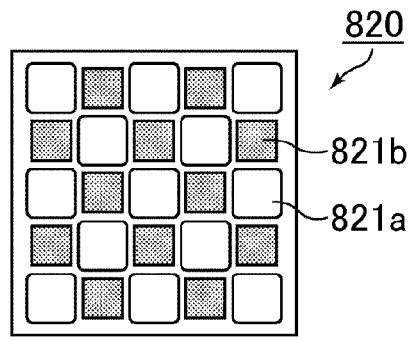
FIG. 2A, FIG. 2B, FIG. 2C, and FIG. 2D are side views each schematically illustrating one example of an end face of the substantially square-cross-section unit according to the honeycomb structure of the embodiment of the present invention.
Figure 3A:
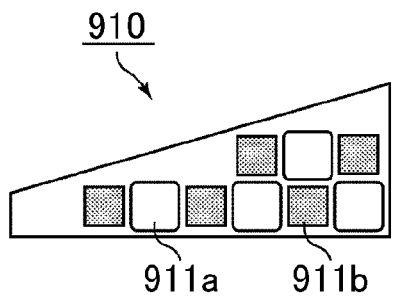
FIG. 3A, FIG. 3B, FIG. 3C, and FIG. 3D are side views each schematically illustrating one example of an end face of the irregular-cross-section unit according to the honeycomb structure of the embodiment of the present invention.
Figure 3B:
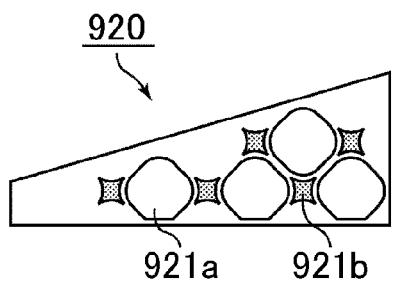
Figure 3C:
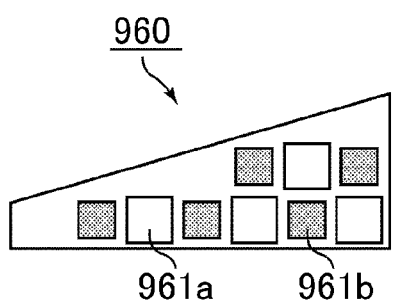
Figure 3D:
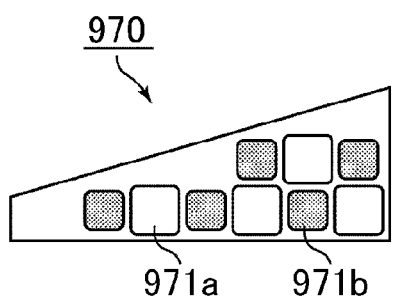
Figure 4A:
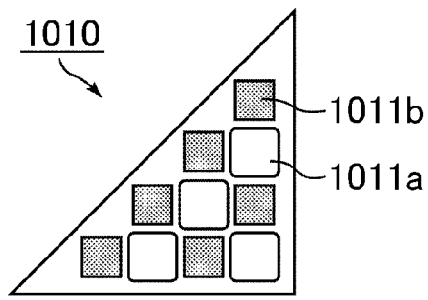
FIG. 4A, FIG. 4B, FIG. 4C, and FIG. 4D are side views each schematically illustrating one example of an end face of the substantially triangular-cross-section unit according to the honeycomb structure of the embodiment of the present invention.
Figure 4B:
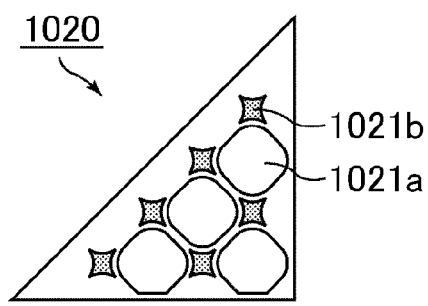
Figure 4C:
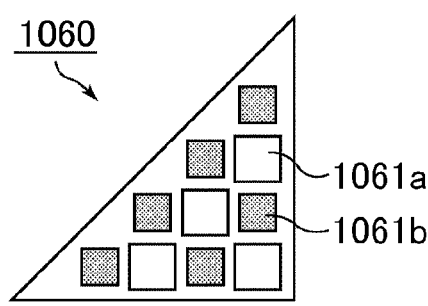
Figure 4D:
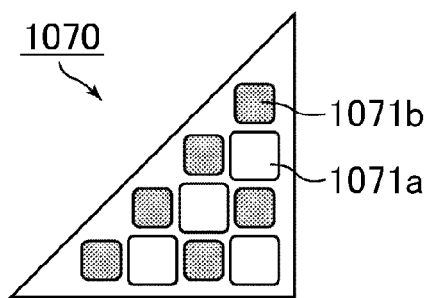

In each of honeycomb fired bodies 820, 910, and 1010 illustrated in FIG. 2A, FIG. 3A, and FIG. 4A, respectively, a cross-section perpendicular to the longitudinal direction of the cell includes repetition of a substantially quadrangular cell 821*a*, 911*a* or 1011*a* in which portions equivalent to the corners are substantially circular-arc shape, and repetition of a substantially quadrangular cell 821*b*, 911*b*, or 1011*b* which has corners and has different cross-sectional shape and cross-sectional area from those of the substantially quadrangular cell. The two kinds of cells with different cross-sectional shapes and cross-sectional areas are the basic cells.

The cells 821*a*, 911*a* and 1011*a*, which have the largest cross-sectional area in the cross-section perpendicular to the longitudinal direction are large-capacity cells. The cells 821*b*, 911*b* and 1011*b*, which have the smallest cross-sectional area perpendicular to the longitudinal direction are small-capacity cells.

Determination of the large-capacity cells and the small-capacity cells in the same manner results in that, in the honeycomb fired bodies illustrated in FIGS. 2B, 2C and 2D, FIGS. 3B, 3C and 3D, and FIGS. 4B, 4C and 4D, the cells 831*a*, 871*a*, 881*a*, 921*a*, 961*a*, 971*a*, 1021*a*, 1061*a*, and 1071*a* are large-capacity cells, and the cells 831*b*, 871*b*, 881*b*, 921*b*, 961*b*, 971*b*, 1021*b*, 1061*b*, and 1071*b* are small-capacity cells.

In the case of using the honeycomb structure for purifying exhaust gas, when the large-capacity cells are used as inlet-side cells through which exhaust gas flows in, and the small-capacity cells are used as outlet-side cells through which exhaust gas comes out, the thickness of PM accumulation layer can be easily thin. Thus, pressure loss can be easily prevented from increasing, and a limit amount for capturing PM can be easily increased. Moreover, accumulated PM can be burned more easily.

In the honeycomb structure of embodiments of the present invention, it is preferable that the cross-sectional shape perpendicular to the longitudinal direction of the large-capacity cell is a substantially quadrangular shape, and the cross-sectional shape perpendicular to the longitudinal direction of the small-capacity cell is a substantially quadrangular shape.

Moreover, it is preferable that the cross-sectional shape perpendicular to the longitudinal direction of the large-capacity cell is a substantially octagonal shape, and the cross-sectional shape perpendicular to the longitudinal direction of the small-capacity cell is a substantially quadrangular shape.

Since the cells having the above shapes are in particular suitable for capturing PM, the PM-capturing efficiency can be easily improved.

In the honeycomb structure of embodiments of the present invention, the cell having a substantially quadrangular shape in the cross section perpendicular to the longitudinal direction preferably includes a substantially circular-arc shape at least one portion equivalent to a corner of the quadrangle.

In the honeycomb fired bodies including the cells with the foregoing shape, cracks tend not to occur. This may be because the thermal stress in regenerating process tends not to concentrate on portions near the corners and is thus more easily reduced as compared with cells having corners.

In the honeycomb structure of embodiments of the present invention, each side of the cross section perpendicular to the longitudinal direction of the large-capacity cells and the small-capacity cells is preferably a curve.

The cells having the above shape are in particular suitable for capturing PM, and thus the PM-capturing efficiency can be easily improved.

In the honeycomb structured of embodiments of the present invention, preferably the large number of cells are sealed at either one end thereof.

In the honeycomb structure of embodiments of the present invention, the shape of the cross section perpendicular to the longitudinal direction of the honeycomb structure is preferably a substantially circular shape, a substantially racetrack shape, a substantially elliptical shape, a substantially triangular shape whose apexes have a curved shape, and the like.

The embodiment of the present invention relates to a honeycomb structure including a ceramic block with a shape similar to the respective shapes mentioned above, a substantially round pillar shape, a substantially pillar shape with a race track end face, a substantially cylindroid shape, a pillar of a substantially triangular shape whose apexes have a curved shape, and the like.

The honeycomb structure of the embodiment of the present invention does not necessarily have a substantially circular shape in the cross section perpendicular to the longitudinal direction, and may have, in the cross section, a substantially racetrack shape, a substantially ellipsoidal shape, a substantially triangular shape whose apexes have a curved shape, and the like. The cross section of the ceramic block also can be formed into a shape similar to a substantially racetrack, a substantially elliptical shape, a substantially triangular shape whose apexes have a curved shape, and the like by using the above-mentioned units in combination.

In addition, when the cross section of the ceramic block has a shape similar to a substantially racetrack, a substantially elliptical shape, a substantially triangular shape whose apexes have a curved shape, and the like, it means that the cross-sectional shape is approximate to each shape although having a projective portion or a recessed portion partly formed from the periphery.

First Embodiment

The following description will discuss a first embodiment, which is one embodiment of the present invention, with reference to drawings.

Figure 5:
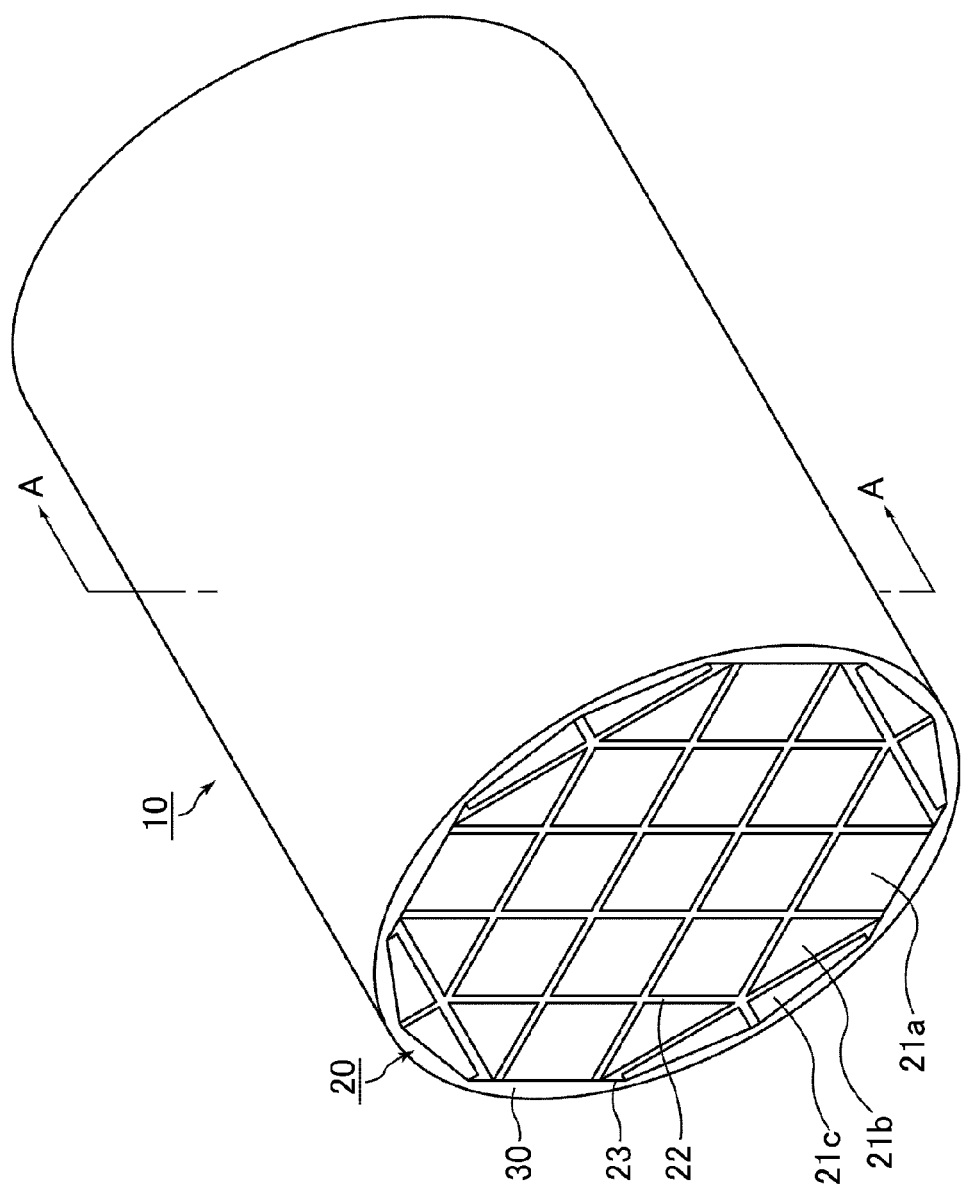
FIG. 5 is a perspective view schematically illustrating one example of a honeycomb structure of a first embodiment of the present invention.
Figure 6A:
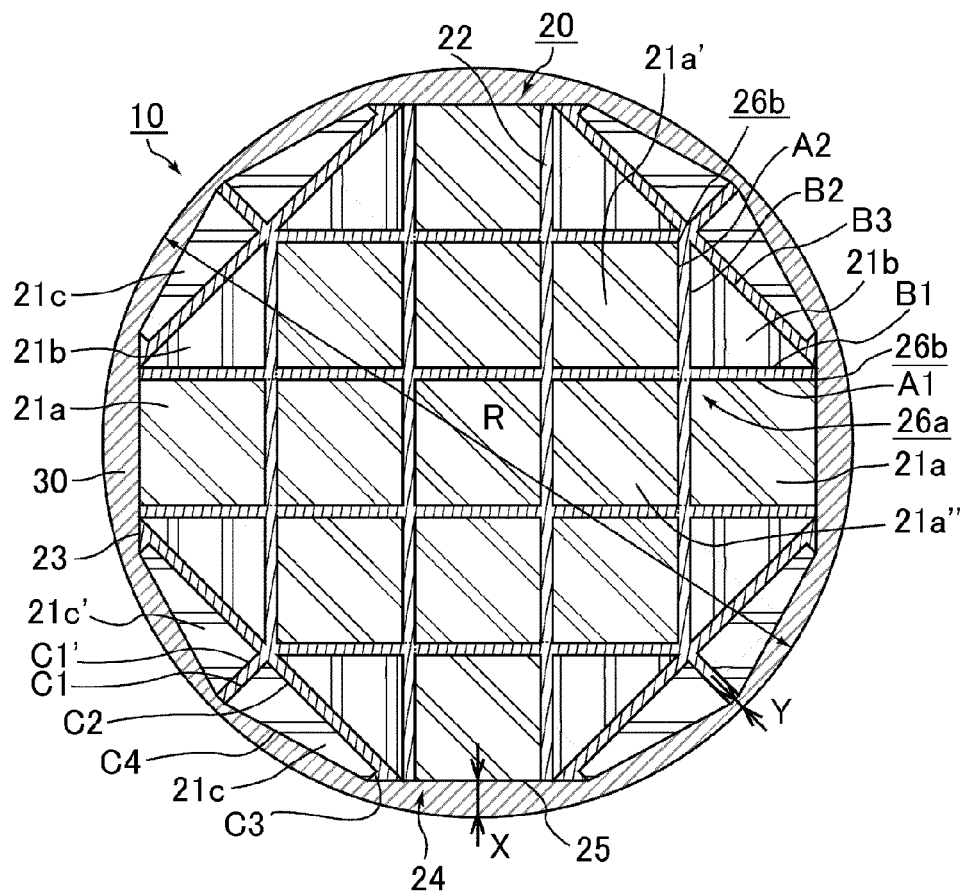
FIG. 6A is a cross sectional view taken along A-A line of the honeycomb structure illustrated in FIG. 5.

FIG. 5 is a perspective view schematically illustrating one example of a honeycomb structure of a first embodiment of the present invention. FIG. 6A is a cross sectional view taken along A-A line of the honeycomb structure illustrated in FIG. 5, and FIG. 6B is a partially enlarged cross sectional view showing a periphery of one of the concave portions in the A-A line cross-sectional view illustrated in FIG. 6A.

Figure 6B:
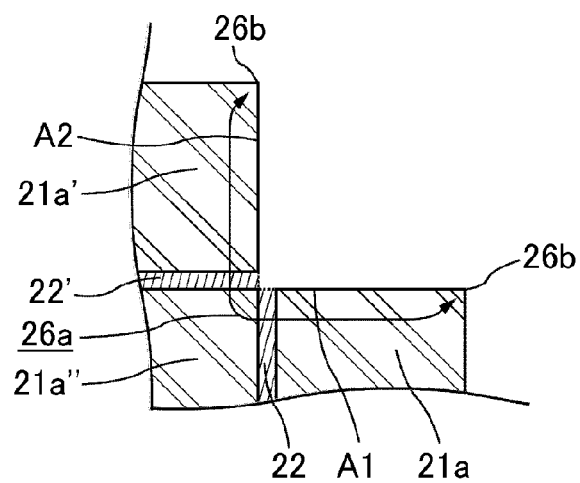
FIG. 6B is a partially enlarged cross sectional view showing a periphery of one of the concave portions in the A-A line cross-sectional view illustrated in FIG. 6A.

Meanwhile, in FIG. 6B, drawings of a substantially isosceles right triangular-cross-section unit fit in the concave portion and an adhesive layer formed between the concave portion and the substantially isosceles right triangular-cross-section unit are omitted.

A honeycomb structure 10 according to the present embodiment illustrated in FIG. 5 and FIG. 6A includes a ceramic block 20 and a sealing material layer 30 formed on a peripheral face 23 of the ceramic block 20.

The honeycomb structure 10 has a substantially round-pillar shape.

The honeycomb structure 10 has a substantially round shape in the cross-section perpendicular to the longitudinal direction and has a diameter (shown by symbol "R" in FIG. 6A) of about 190 mm or more.

In the case that the cross section of the honeycomb structure perpendicular to the longitudinal direction has a substantially racetrack shape, a substantially elliptical shape, or a substantially triangular shape whose apexes have a curved shape, the longest line segment of line segments each of which passes through the center of each shape and joints two points on the periphery preferably has a length of about 190 mm or more.

The ceramic block 20 includes a plurality of honeycomb fired bodies 21a, 21b, and 21c, which are made of porous silicon carbide ceramics, combined with an adhesive layer 22 interposed therebetween.

The shape of the cross section perpendicular to the longitudinal direction of the ceramic block is a substantially dodecagonal shape.

As illustrated in FIG. 7A, FIG. 7B, FIG. 8A, FIG. 8B, FIG. 9A, and FIG. 9B, the plurality of the honeycomb fired bodies 21a, 21b, and 21c include three kinds of units having different shapes from one another.

Figure 7A:
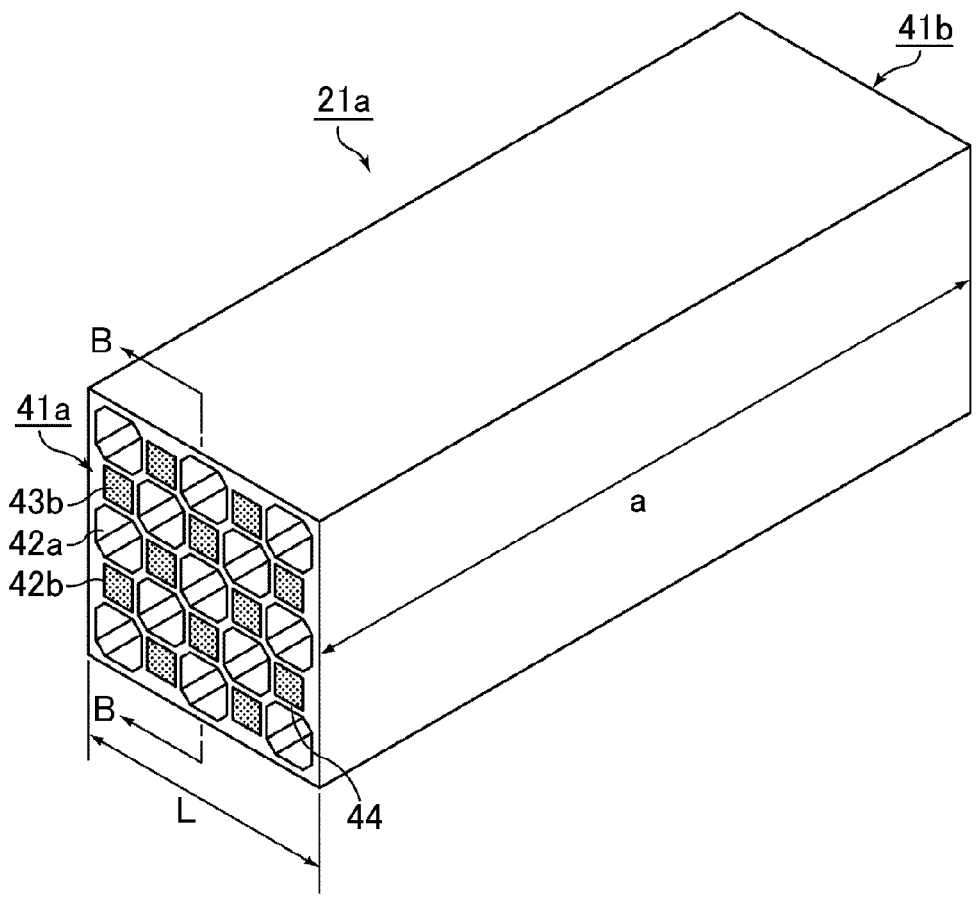
FIG. 7A is a perspective view schematically illustrating one example of a quadrangular-cross-section unit, which configures the honeycomb structure of the first embodiment of the present invention.
Figure 7B:
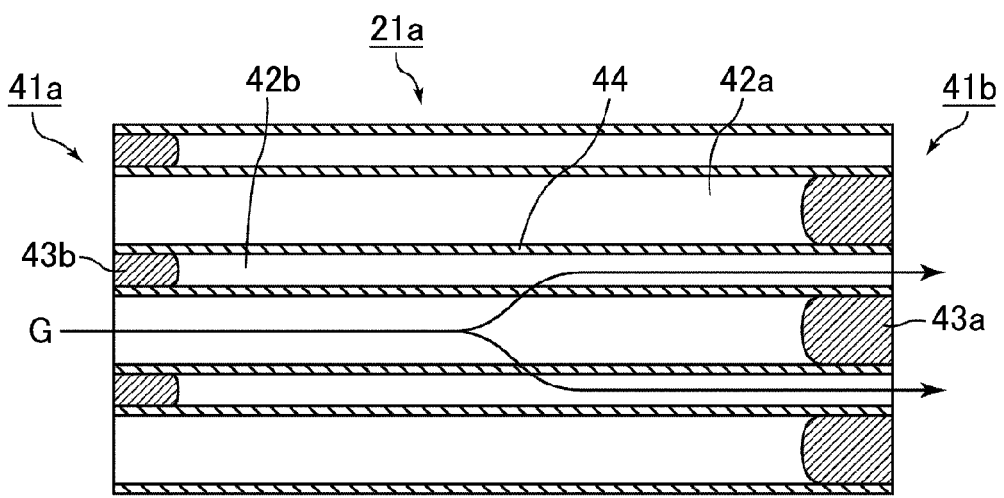
FIG. 7B is a cross sectional view taken along B-B line of the quadrangular-cross-section unit illustrated in FIG. 7A.

FIG. 7A is a perspective view schematically illustrating one example of a substantially quadrangular-cross-section unit, which configures the honeycomb structure of the first embodiment of the present invention. FIG. 7B is a cross sectional view taken along B-B line of the substantially quadrangular-cross-section unit illustrated in FIG. 7A.

Figure 8A:
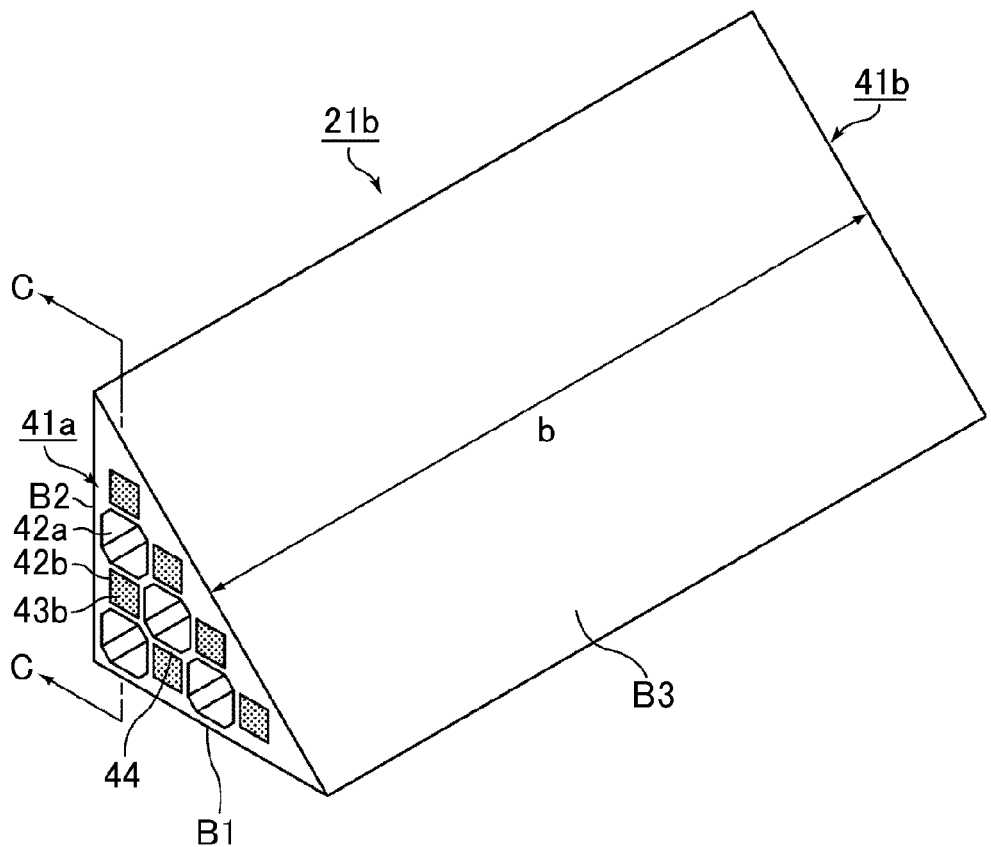
FIG. 8A is a perspective view schematically illustrating one example of a triangular-cross-section unit, which configures the honeycomb structure of the first embodiment of the present invention.
Figure 8B:
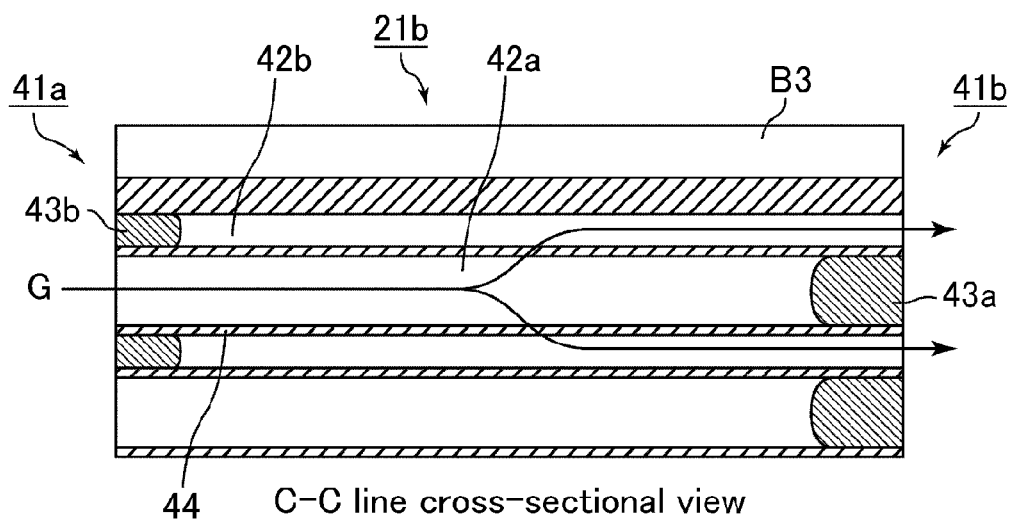
FIG. 8B is a cross sectional view taken along C-C line of the triangular-cross-section unit illustrated in FIG. 8A.

FIG. 8A is a perspective view schematically illustrating one example of a substantially triangular-cross-section unit, which configures the honeycomb structure of the first embodiment of the present invention. FIG. 8B is a cross sectional view taken along C-C line of the substantially triangular-cross-section unit illustrated in FIG. 8A.

Figure 9A:
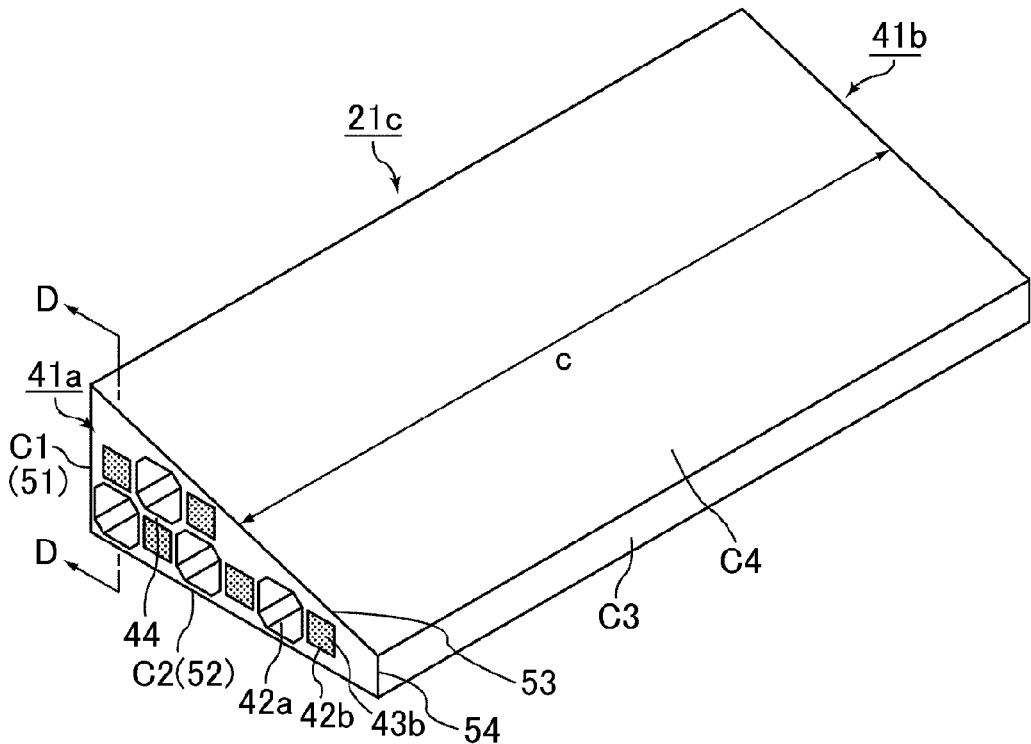
FIG. 9A is a perspective view schematically illustrating one example of an irregular-cross-section unit, which configures the honeycomb structure of the first embodiment of the present invention.
Figure 9B:
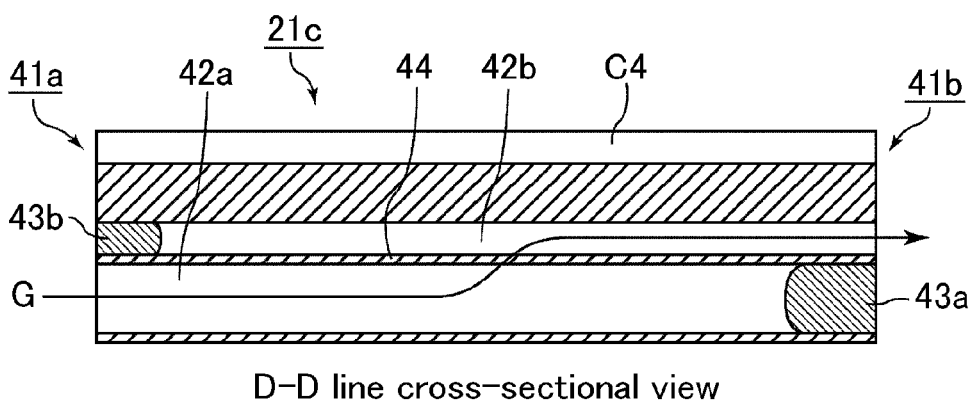
FIG. 9B is a cross sectional view taken along D-D line of the irregular-cross-section unit illustrated in FIG. 9A.

FIG. 9A is a perspective view schematically illustrating one example of an irregular-cross-section unit, which configures the honeycomb structure of the first embodiment of the present invention. FIG. 9B is a cross sectional view taken along D-D line of the irregular-cross-section unit illustrated in FIG. 9A.

The honeycomb fired body 21a illustrated in FIG. 7A and FIG. 7B is a substantially quadrangular-cross-section unit in which the shape (hereinafter, a shape of cross section perpendicular to the longitudinal direction of the units and the like may simply be referred to as a cross-sectional shape) of the cross section perpendicular to the longitudinal direction (direction shown by a double-headed arrow "a" in FIG. 7A) is a substantially quadrangular shape. Specifically, a cross-sectional shape of the substantially quadrangular-cross-section unit has four sides which are approximately the same length with one another and has four corners formed by perpendicularly crossing of one of the four sides with the other sides. In other words, the substantially quadrangular-cross-section unit is a substantially square-cross-section unit in which the cross-sectional shape is substantially square shape.

The substantially quadrangular-cross-section unit 21a has a first end face 41a and a second end face 41b, and the length (length shown by a double-headed arrow "L" in FIG. 7A) of one side of the first end face 41a (second end face 41b) is preferably from about 31.5 mm to about 38.7 mm.

The length of the square-cross-section unit 21a perpendicular to the longitudinal direction thereof is preferably from about 101.6 mm to about 381.6 mm (from about 4 inches to about 15 inches).

The substantially square-cross-section unit 21a has a large-capacity cell 42a having a larger area in a cross section perpendicular to the longitudinal direction than that of a small-capacity cell 42b, and the small-capacity cell 42b having a smaller area in a cross section perpendicular to the longitudinal direction than that of the large-capacity cell 42a.

The large-capacity cell 42a has a substantially octagonal shape in a cross section perpendicular to the longitudinal direction thereof, and the small-capacity cell 42b has a substantially quadrangular shape in a cross section perpendicular to the longitudinal direction thereof.

As illustrated in FIG. 7B, in the large-capacity cell 42a, an end portion on the side of the first end face 41a is open, and an end portion on the side of the second end face 41b is sealed with a plug 43a.

In the small-capacity cell 42b, an end portion on the side of the second end face 41b is open, and an end portion on the side of the first end face 41a is sealed with a plug 43b.

Therefore, a cell wall 44 which separates the large-capacity cell 42a and the small-capacity cell 42b functions as a filter. Namely, exhaust gas G flowing into the large-capacity cell 42a flows out from the small-capacity cell 42b after surely passing through the cell wall 44.

Here, in the present description, the shape of the respective units and the shape of the cells are expressed as substantially triangle, substantially quadrangle, and the like, but those in the present description are not required to be a strict triangle, quadrangle, and the like formed only by completely straight lines, and may be shapes whose corner(s) (apex(es)) is chamfered with a straight or curved line and which can be almost identified with a triangle, quadrangle, and the like. Further, in the present description, the terms "substantially right angle", "substantially parallel", "substantially isosceles right triangle", and the like do not mean mathematically strict shapes, and include shapes that can be almost identified with shapes of "right angle", "parallel", "isosceles right angle", and the like.

Next, the structure of other unit is described in detail.

A honeycomb fired body 21b illustrated in FIG. 8A and FIG. 8B has a first end face 41a and a second end face 41b, and is a substantially triangular-cross-section unit having a substantially triangular shape in the cross section.

More specifically, the substantially triangular-cross-section unit 21b is a substantially isosceles right triangular-cross-section unit having a substantially isosceles right triangular shape in the cross section. The cross-sectional shape is identical with a shape obtainable by substantially dividing the substantially square-cross-section unit 21a with a plain face including a diagonal line of the first end face 41a and a diagonal line of the second end face 41b of the substantially square cross-section unit 21a illustrated in FIG. 7A and FIG. 7B.

Hereinafter, a side surface including the hypotenuse of the substantially isosceles right triangular shape in the substantially isosceles right triangular-cross-section unit 21b is referred to as a third side surface B3, and the two side surfaces other than the third side surface B3 are respectively referred to as a first side surface B1 and a second side surface B2.

In the cross-sectional shape of the substantially isosceles right triangular-cross-section unit 21b, the length of the two sides forming the first side surface B1 and the second side surface B2, other than the hypotenuse, is preferably from about 31.5 mm to about 38.7 mm, and the length of the hypotenuse forming the third side surface B3 of the substantially isosceles right triangle is preferably from about 40.9 mm to about 54.9 mm.

The length of the substantially isosceles right triangular-cross-section unit 21b in the longitudinal direction (the length shown by the double-headed arrow "b" in FIG. 8A) is approximately the same with the longitudinal length of the substantially square-cross-section unit 21a, and is preferably from about 101.6 mm to about 381.6 mm.

Cells formed in the substantially isosceles right triangular-cross-section unit 21b illustrated in FIG. 8A and FIG. 8B include the large-capacity cell 42a having a substantially octagonal cross-sectional shape and the small-capacity cell 42b having a substantially quadrangular cross-sectional shape, in substantially the same manner as the substantially square-cross-section unit 21a.

The cell wall 44 which separates the large-capacity cells 42a and the small-capacity cells 42b is bound to the first side surface B1, the second side surface B2, and the third side surface B3 which are outer walls forming the periphery of the substantially isosceles right triangular-cross-section unit 21b.

As illustrated in FIG. 8B, in the large-capacity cell 42a, an end portion on the side of the first end face 41a is open, and an end portion on the side of the second end face 41b is sealed with the plug 43a. In the small-capacity cell 42b, the end portion on the side of the second end face 41b is open, and the end portion on the side of the first end face 41a is sealed with the plug 43b.

Thus, the cell wall 44 separating the large-capacity cell 42a and the small-capacity cell 42b functions as a filter in substantially the same manner as in the case of the substantially square-cross-section unit 21a.

Next, the structure of still other unit is described in detail.

A honeycomb structure 21c shown in FIG. 9A and FIG. 9B has a first end face 41a and a second end face 41b, and is an irregular-cross-section unit in which the cross-sectional shape includes at least a first side, a second side forming a substantially right angle with the first side, and a inclined line which faces the substantially right angle.

The specific cross-sectional shape of the irregular-cross-section unit 21c includes a first side 51, a second side 52, an inclined line 53, and a third side 54. The angle formed by the first side 51 and the second side 52 is a substantially right angle, and the inclined line 53 is provided to face the substantially right angle and is a straight line. The third side 54 is a side connecting the inclined line 53 and the second side 52, and is substantially in parallel with the first side 51.

Namely, the irregular-cross-section unit 21c is a substantially trapezoidal-cross-section unit having a substantially trapezoidal shape in the cross section.

In the following explanation, a side surface including the first side 51 of the substantially trapezoidal-cross-section unit 21c, a side surface including the second side 52 of the substantially trapezoidal-cross-section unit 21c, a side surface including the third side 54, and a side surface including the inclined line 53 of the substantially trapezoidal-cross-section unit 21c are referred to as a first side surface C1, a second side surface C2, a third side surface C3, and a fourth side surface C4, respectively.

In the cross-sectional shape of the substantially trapezoidal-cross-section unit 21c, the length of the first side 51 is preferably from about 12.0 mm to about 25.5 mm, the length of the second side 52 is longer than the length of the first side 51 and preferably from about 49.8 mm to about 56.9 mm, and the length of the third side 54 is preferably from about 3.6 mm to about 10.0 mm.

The longitudinal length (the length shown by the double-headed arrow "c" in FIG. 9A) of the substantially trapezoidal-cross-section unit 21c is almost the same with the longitudinal length of the substantially square-cross-section unit 21a, and is preferably from about 101.6 mm to about 381.6 mm.

Cells formed in the substantially trapezoidal-cross-section unit 21c shown in FIG. 9A and FIG. 9B include the large-capacity cell 42a having a substantially octagonal cross-sectional shape and the small-capacity cell 42b having a substantially quadrangular cross-sectional shape, in the same manner as the substantially square-cross-section unit 21a.

The cell wall 44 which separates the large-capacity cell 42a and the small-capacity cell 42b is bound to the first side surface C1, the second side surface C2, the third side surface C3 and the fourth side surface C4, which are outer walls forming the periphery of the substantially trapezoidal-cross-section unit 21c.

As illustrated in FIG. 9B, in the large-capacity cell 42a, the end portion on the side of the first end face 41a is open, and the end portion on the side of the second end face 41b is sealed with the plug 43a. In the small-capacity cell 42b, the end portion on the side of the second end face 41b is open, and the end portion on the side of the first end face 41a is sealed with the plug 43b.

Thus, the cell wall 44 separating the large-capacity cell 42a and the small-capacity cell 42b functions as a filter in the same manner as in the case of the substantially square-cross-section unit 21a.

A detailed structure of the ceramic block 20 formed by using each of the above-mentioned units is described below with reference to FIG. 6A and FIG. 6B.

The ceramic block 20 illustrated in FIG. 6A includes a plurality of honeycomb fired bodies, specifically, twenty-nine pieces of the honeycomb fired bodies including thirteen pieces of the substantially square-cross-section units 21a, eight pieces of the substantially isosceles right triangular-cross-section units 21b, and eight pieces of the substantially trapezoidal-cross-section units 21c are combined with one another with the adhesive layer 22 interposed therebetween.

The adhesive layer 22 includes inorganic fibers such as alumina fibers, inorganic particles such as silicon carbide, an inorganic binder such as silica sol, an organic binder such as carboxymethyl cellulose, and the like.

The adhesive layer 22 preferably has a thickness of from about 0.5 mm to about 2.0 mm.

More concretely, in the ceramic block 20, thirteen pieces of the substantially square-cross-section units 21a are combined with one another with the adhesive layer 22 interposed therebetween so that an assembly 24 of the substantially square-cross-section units having a cross-sectional shape of an icosagon is formed.

A periphery face 25 of the assembly 24 of the substantially square-cross-section units has concave portions 26a and convex portions 26b which are formed in a substantially step-shaped pattern, and the concave portions 26a exist at eight sites.

The detailed structure of one of the convex portions 26a is described below. The concave portion 26a indicated by the double-headed arrow in FIG. 6B is formed by including a first side surface A1 of the first substantially square-cross-section unit 21a, a second side surface A2 of the second substantially square-cross-section unit 21a' provided approximately vertically to the first side surface A1, and adhesive layers. The adhesive layers include an adhesive layer 22 formed between the first substantially square-cross-section unit 21a and a third substantially square-cross-section unit 21a'' which is provided next to the first substantially square-cross-section unit 21a, and the adhesive layer 22' formed between the third substantially square-cross-section unit 21a'' and the second substantially square-cross-section unit 21a'.

As illustrated in FIG. 6A, the substantially isosceles right triangle-cross-section unit 21b is fit in the concave portion 26a with the adhesive layer 22 interposed therebetween.

Specifically, the first side surface A1 of the first substantially square-cross-section unit 21a and the first side surface B1 of the substantially isosceles right triangle-cross-section unit 21b is connected to each other with the adhesive layer 22 interposed therebetween.

The second side surface A2 of the first substantially square-cross-section unit 21a' and the second side surface B2 of the substantially isosceles right triangle-cross-section unit 21b is connected to each other with the adhesive layer 22 interposed therebetween.

The third side surface B3 of the substantially isosceles right triangular cross-section unit 21b is not connected to a side surface of the substantially square-cross-section unit.

Relation between the other convex portion and the other substantially isosceles right triangular-cross-section unit 21b is substantially similar, and each of the substantially isosceles right triangular-cross-section units 21b is fit in each of the eight concave portions 26a with the adhesive layer 22 interposed therebetween.

The concave portions and the convex portions formed on the periphery face 25 of the assembly 24 of the substantially square-cross-section units have been smoothed by the arrangement of the substantially isosceles right triangular-cross-section units as mentioned earlier.

The third side surface B3 of the substantially isosceles right triangular-cross-section unit 21b is connected to the second side surface C2 of the substantially trapezoidal-cross-section unit 21c with the adhesive layer interposed therebetween. The first side surface C1 of the substantially trapezoidal-cross-section unit 21c is connected to the first side surface C1' of adjacent another substantially trapezoidal-cross-section unit 21c' with the adhesive layer interposed therebetween. The fourth side surface C4 of the substantially trapezoidal-cross-section unit 21c forms a part of the peripheral face 23 of the ceramic block 20. Other substantially trapezoidal-cross-section units have substantially similar structures.

Accordingly, the cross-sectional shape perpendicular to the longitudinal direction of the ceramic block 20 is a substantially dodecagonal shape.

The following will discuss the sealing material layer 30.

The sealing material layer 30 is formed on the peripheral face 23 of the ceramic block 20, and has partially different thickness so that the honeycomb structure 10 has a substantially round-pillar shape.

The ratio (the thickness of the thickest part of the sealing material layer 30: the thickness of the thinnest part of the sealing material layer 30) of the thickness of the thickest part of the sealing material layer 30 (distance X between the two arrows in FIG. 6A) to the thickness of the thinnest part of the sealing material layer 30 of the sealing material layer 30 (distance Y between the two arrows in FIG. 6A) is preferably from about 20:about 1 to about 5:about 3, more preferably from about 4:about 1 to about 3:about 1, and further preferably from about 7.8:about 2.3 to about 8.3:about 3.0.

Specifically, the thickness of the thickest part of the sealing material layer 30 is preferably from about 5.0 mm to about 10.0 mm, more preferably from about 8.0 mm to about 9.0 mm, and further preferably from about 8.2 mm to about 8.7 mm.

The thickness of the thinnest part of the sealing material layer 30 is preferably from about 0.5 mm to about 3.0 mm, more preferably from about 1.0 mm to about 2.5 mm, and further preferably from about 1.6 mm to about 2.3 mm.

In the case that the ratio of the thickness of the thickest part of the sealing material layer 30 to the thickness of the thinnest part of the sealing material layer 30 is within the above range, the PM-capturing efficiency tends to be increased and the thermal stress is more likely to be sufficiently reduced during regenerating process.

Meanwhile, in the case that the thickness of the thickest part of the sealing material layer is about 10.0 mm or less, the portion where the thickness of the sealing material layer is too high tends not to be increased too much, which tends not to reduce the open cells in the end face of the honeycomb structure. As a result, the PM-capturing efficiency tends not to become low. The lower limit of the thickness of the thickest part of the sealing material layer is not particularly limited, and is preferably about 5.0 mm.

In the case that the thickness of the thinnest part of the sealing material layer is about 0.5 mm or more, reduction of the thermal stress tends to become easy as the sealing material layer is not too thin.

The material of the sealing material layer 30 is substantially the same as that of the sealing material layer 22.

Since the sealing material layer 30 formed on the peripheral face 23 of the ceramic block 20 easily absorbs external force such as impact, the honeycomb structure 10 tends not to be damaged.

Next, the following description will discuss a method for manufacturing the honeycomb structure of the present embodiment.

A method for manufacturing the honeycomb structure of the present embodiment is a method for manufacturing a honeycomb structure, including: molding a ceramic raw material to manufacture honeycomb molded bodies each including a large number of cells placed in parallel with one another in a longitudinal direction with a cell wall interposed therebetween; firing the honeycomb molded bodies to prepare honeycomb fired bodies; combining a plurality of the honeycomb fired bodies with one another with an adhesive layer interposed therebetween to prepare a ceramic block; and forming a sealing material layer on the peripheral face of the ceramic block, wherein in the molding and firing, at least a substantially quadrangular-cross-section unit and a substantially triangular-cross-section unit are produced, the substantially quadrangular-cross-section unit has a substantially quadrangular shape in the cross section perpendicular to the longitudinal direction, the substantially triangular-cross-section unit has a substantially triangle shape in the cross section perpendicular to the longitudinal direction, and has an outer wall formed on a peripheral portion thereof, and in the combining, a plurality of the substantially quadrangular-cross-section units are combined with one another with an adhesive layer interposed therebetween to prepare an assembly of the substantially quadrangular-cross-section units having on the peripheral face thereof concave portions and convex portions formed in a substantially step-shaped pattern, the substantially triangular-cross-sectional unit is fit in the concave portion with the adhesive layer interposed therebetween, and, in the sealing material layer forming, the sealing material layer is formed in a manner as to have partially different thickness.

According to the method for manufacturing the honeycomb structure of the present embodiment, preferably, in the combining, the concave portion is formed by including a first side surface of the first substantially quadrangular-cross-section unit and a second side surface of the second substantially quadrangular-cross-section unit, the first side surface and a first side surface of the substantially triangular-cross-section unit are combined with the adhesive layer interposed therebetween, the second side surface and a second side surface of the substantially triangular-cross-section unit are combined with the adhesive layer interposed therebetween, and a third side surface of the substantially triangular-cross-section unit is not combined with any side surface of the substantially quadrangular-cross-section unit.

According to the method for manufacturing the honeycomb structure of the present embodiment, preferably, in the molding and the firing, a substantially quadrangular-cross-section unit having a substantially square cross-sectional shape is manufactured, a substantially triangular-cross-section unit which has a substantially right triangle shape in the cross section and has a shape corresponding to a shape obtained by substantially dividing the substantially quadrangular-cross-section unit with a plain surface including diagonal lines of a first end face and a second end face of the substantially quadrangular-cross-section unit, and in the combining, a side surface including the hypotenuse of the substantially right triangle is not combined with any side surface of the substantially quadrangular-cross-section unit.

According to the method for manufacturing the honeycomb structure of the present embodiment, preferably in the molding and firing, an irregular-cross-section unit is formed which has a shape including at least a first side, a second side forming a substantially right angle with the first side, and a inclined line facing the substantially right angle in the cross section perpendicular to the longitudinal direction, and in the combining, the irregular-cross-section unit is disposed in a manner that the side surface including the inclined line constitutes the peripheral face of the ceramic block.

According to the method for manufacturing the honeycomb structure of the present embodiment, preferably, in the combining, the side surface including the second side of the irregular-cross-section unit is combined with the substantially triangular-cross-section unit with the adhesive layer interposed therebetween.

The following description will discuss the method for manufacturing the honeycomb structure of the present embodiment in the order of the process.

Firstly, ceramic powders such as silicon carbide powders having different average particle diameters as a ceramic raw material are mixed with an organic binder, a liquid-state plasticizer, a lubricant, water, and the like to prepare a wet mixture for manufacturing molded bodies.

Successively, molding is carried out in which the wet mixture is extrusion-molded with an extrusion molding apparatus to prepare honeycomb molded bodies with a specific shape.

Specifically, a honeycomb molded body is manufactured which has a large-capacity cell with a substantially octagonal shape in the cross-sectional view and a small-capacity cell with a substantially quadrangle shape in the cross-sectional view, and has a substantially square cross-sectional shape as illustrated in FIG. 7A and FIG. 7B. Further, a honeycomb molded body having a substantially isosceles right triangle cross-sectional shape as illustrated in FIG. 8A and FIG. 8B and a honeycomb molded body having a substantially trapezoidal cross-sectional shape as illustrated in FIGS. 9A and 9B are manufactured by changing the shapes of the dies.

Meanwhile, the honeycomb molded body having a substantially square cross-sectional shape is made into a substantially square-cross-section unit after firing which is mentioned later. The honeycomb molded body having a substantially isosceles right triangular cross-sectional shape becomes a substantially isosceles right triangular-cross-section unit after firing which is mentioned later. The honeycomb molded body having a substantially trapezoidal cross-sectional shape becomes a substantially trapezoidal-cross-section unit after firing which is mentioned later.

In the following processes, the term "honeycomb molded bodies" is intended to refer to these three kinds of honeycomb molded bodies without distinguishing the three.

Next, cutting is carried out in which both ends of the honeycomb molded bodies are cut into a predetermined length with a cutting apparatus, and the cut honeycomb molded bodies are dried with a drying apparatus.

Successively, a plug material paste that is to be a plug in a specific amount is filled into the cells at either one end thereof to seal the cells. Through these processes, honeycomb molded bodies with the sealed cells are manufactured.

Here, the above-mentioned wet mixture can be used as the plug material paste.

Next, degreasing is carried out in which organic matters in the honeycomb molded bodies with the sealed cells are heated in a degreasing furnace. Thus, honeycomb degreased bodies are manufactured. These honeycomb degreased bodies have a shape almost the same as that of the respective honeycomb fired bodies illustrated in FIG. 7A, FIG. 7B, FIG. 8A, FIG. 8B, FIG. 9A, and FIG. 9B.

Then, the honeycomb degreased bodies are transported into a firing furnace, and then fired at from about 2000° C. to about 2300° C. under argon atmosphere to manufacture honeycomb fired bodies having shapes illustrated in FIG. 7A, FIG. 7B, FIG. 8A, FIG. 8B, FIG. 9A, and FIG. 9B, i.e. square-cross-section units, isosceles right triangular-cross-section units, and trapezoidal-cross-section units.

Subsequently, combining is carried out in which the adhesive paste layer is formed on predetermined side surfaces of the honeycomb fired bodies, and then heated and solidified to form an adhesive layer, and thus the honeycomb fired bodies are combined with one another by interposing the adhesive layer therebetween to manufacture a ceramic block.

An adhesive paste containing inorganic fibers and/or a whisker, an inorganic binder, and an organic binder is suitably used as the adhesive paste.

In the binding, firstly the adhesive material paste is applied to a side surface of the substantially square-cross-section unit to form an adhesive material paste layer. Other substantially square-cross-section unit is piled up on this adhesive paste layer and this operation is repeated. This operation forms an assembly of the substantially square-cross-section units having a cross-section with a substantially icosagonal shape shown in FIG. 5, FIG. 6A, and FIG. 6B.

Next, the adhesive paste layer is applied on each of eight concave portions formed on the peripheral face of the assembly of substantially square-cross-section units to form an adhesive material paste layer.

Then, one piece of the substantially isosceles right triangular-cross-section unit is fit in each of the eight concave portions in a manner that the first side surface of the first substantially square-cross-section unit contacts the first side surface of the substantially isosceles right triangle-cross-section unit with the adhesive material paste layer interposed therebetween, and the second side surface of the second substantially square-cross-section unit contacts the second side surface of the substantially isosceles right triangular-cross-section unit with the adhesive material paste interposed therebetween.

Subsequently, the adhesive material paste is applied on a third side surface of the substantially isosceles right triangle-cross-section unit to form an adhesive material paste layer.

Then the substantially isosceles right triangular-cross-section unit and the substantially trapezoidal-cross-section unit are combined in a manner that the third side surface of the substantially isosceles right triangular-cross-section unit contacts the second side surface of one of the substantially trapezoidal-cross-section units with the adhesive material paste interposed therebetween.

Other substantially trapezoidal-cross-section units are combined with the substantially isosceles right triangular-cross-section units in the same manner as mentioned earlier. In this process, the adhesive material paste layer is formed between the first side surface of one of the substantially trapezoidal-cross-section units and the first side surface of the other substantially trapezoidal-cross-section unit.

This operation forms a ceramic block having a cross-section with a substantially dodecagonal shape, in which thirteen pieces of the substantially square-cross-section units, eight pieces of the substantially isosceles right triangular-cross-section units, and eight pieces of the substantially trapezoidal-cross-section units are combined with one another with the adhesive layer interpose therebetween, as illustrated in FIG. 5 and FIG. 6A.

Next, sealing material layer forming process is performed by applying a sealing material paste to the peripheral face of the ceramic block, and then drying and solidifying the sealing material paste to form a sealing material layer (coat layer), and thereby a honeycomb structure having a substantially round pillar shape is manufactured.

In this process, the sealing material paste is applied on the peripheral face of the ceramic block in a manner that a honeycomb structure to be manufactured through this process has a substantially round pillar shape. This is carried out by adjusting the thickness of the sealing material paste to be applied on the peripheral face of the ceramic block so that the thickness on the side surface of the substantially trapezoidal-cross-section unit is thin and that on the side surface of the substantially square-cross-section unit (assembly of the substantially square-cross-section units) is thick. For example, the sealing material paste is applied in a manner that the ratio of the thickness of the thickest part of the sealing material layer to the thickness of the thinnest part of the sealing material layer is from about 20:about 1 to about 5:about 3 in a manufactured honeycomb structure. Specifically, the sealing material paste is applied in a manner that the thickest part of the sealing material layer has a thickness of from about 5.0 mm to about 10.0 mm, and the thinnest part of the sealing material layer has a thickness of about 0.5 mm to about 3.0 mm in the manufactured honeycomb structure.

As the sealing material paste, a paste similar to the adhesive material paste may be used.

Through the above process, the honeycomb structure of the present embodiment is manufactured.

Meanwhile, although a paste substantially similar to the sealing material paste may be used, a paste having different compositions may also be used as the sealing material paste.

Through the above process, the honeycomb structure of the present embodiment can be manufactured.

The effects of the honeycomb structure of the present embodiment are listed below.

(1) The honeycomb structure according to the present embodiment does not require cutting process for cutting the peripheral face of the ceramic block for the production. Therefore, low production cost can be easily achieved.

The reason for this is explained below.

First, the case where the ceramic block is formed only of the assembly of the substantially square-cross-section units is considered.

A peripheral face of the assembly of substantially square-cross-section units has concave portions and convex portions formed in a substantially step-shaped pattern and thus has irregularities. For this reason, in the case of forming a sealing material layer having substantially uniform thickness on the peripheral face of the assembly of the substantially square-cross-section units, the resulting honeycomb structure has not a substantially round pillar shape, a substantially pillar shape with a race track end face, a substantially cylindroid shape, a pillar of a substantially triangular shape whose apexes have a curved shape, and the like but has a rectangular pillar shape deriving from the shape of the assembly of the substantially square-cross-section units.

For forming the honeycomb structure into a substantially round pillar-shape, a substantially pillar shape with a race track end face, a substantially cylindroid shape, a pillar of a substantially triangular shape whose apexes have a curved shape, and the like, one possible solution may be preliminarily cutting the assembly of the substantially square-cross-section units into a substantially round pillar shape, a substantially pillar shape with a race track end face, a substantially cylindroid shape, a pillar of a substantially triangle whose apexes have a curved shape, and the like. However, such cutting increases the production cost.

In especially the case of manufacturing a large-scale honeycomb structure, the peripheral face of the ceramic body needs to be cut in a large amount. As a result, the production cost may increase and the processing (cutting process) may take a longer time.

Meanwhile, according to the honeycomb structure of the present embodiment, substantially triangle-cross-section units are fit in the concave portions formed on the peripheral face of the assembly of the substantially square-cross-section units by interposing the adhesive layer. Therefore, the irregularities formed by the concave portions and the convex portions are filled and smoothed. As a result, the shape of the ceramic block becomes more like a polygonal pillar similar to a substantially round pillar, a substantially pillar shape with a race track end face, a substantially cylindroid shape, a pillar of a substantially triangular shape whose apexes have a curved shape, and the like as much as possible, compared with the assembly of the substantially square-cross-section units.

Accordingly, honeycomb structures having a substantially round-pillar shape, a substantially pillar shape with a race track end face, a substantially cylindroid shape, a pillar of a substantially triangle whose apexes have a curved shape, and the like is more likely to be easily manufactured by forming a sealing material layer having partially different thickness on the peripheral face of the ceramic block without cutting. Thus, low production cost can be easily achieved.

Further, the partially different thickness of the sealing material layer formed on the peripheral face of the ceramic block makes it possible easily to form the honeycomb structure into desired shapes such as a substantially round pillar shape, a substantially pillar shape with a race track end face, a substantially cylindroid shape, a pillar of a substantially triangle whose apexes have a curved shape, and the like.

(2) Especially according to the honeycomb structure of the present embodiment, the third side surface including the inclined line of the substantially trapezoidal-cross-section unit forms the peripheral face of the ceramic block. Therefore, the ceramic block has a shape more similar to a substantially round-pillar shape, a substantially pillar shape with a race track end face, a substantially cylindroid shape, a pillar of a substantially triangular shape whose apexes have a curved shape, and the like, allowing the honeycomb structure to preferably enjoy the foregoing effect (1) easily.

(3) In the case that the ratio of the thickness of the thickest part of the sealing material layer to the thickness of the thinnest part of the sealing material layer is from about 20:about 1 to about 5:about 3, the PM-capturing efficiency can be easily improved and also the thermal stress in regenerating process is more likely to be sufficiently reduced.

Especially in the case of the sealing material layer having the thickness of from about 5.0 mm to about 10.0 mm in the thickest part and the thickness of from about 0.5 mm to about 3.0 mm in the thinnest part, the PM-capturing efficiency can be further improved easily and the thermal stress in regenerating process is more likely to be more sufficiently reduced.

(4) The large number of cells formed in the honeycomb fired body include large-capacity cells having a substantially octagonal cross-sectional shape and small-capacity cells having a substantially quadrangular cross-sectional shape.

When using the honeycomb structure of the present embodiment for purifying exhaust gas, the large-capacity cells are easily set as gas inlet side cells from which exhaust gas flows in, and the small-capacity cells are set as gas outlet side cells from which exhaust gas flows out so that the total surface area of the gas inlet side cells can be larger than that of the gas outlet side cells.

As a result, upon purification of exhaust gas, the thickness of PM accumulation layer can be easily thinner as compared with honeycomb structures in which the total surface area of gas inlet side cells and the total surface area of the gas outlet side cells are substantially equal to one another. Thus, the pressure loss can be easily prevented from increasing and a limit amount for capturing PM can be easily increased.

In comparison in that a predetermined amount of PM is captured, the thickness of the PM accumulation layer becomes thinner and thus PM can be more easily burned.

Moreover, since the cell shape is especially preferable for capturing PM, the PM-capturing efficiency is more likely to be improved.

Second Embodiment

The following description will discuss a second embodiment, which is one embodiment of the honeycomb structure according to the present invention with reference to drawings.

The honeycomb structure of the present embodiment has a structure substantially similar to that of the honeycomb structure according to the first embodiment, except that: substantially square-cross-section units and substantially isosceles right triangular-cross-section units are used as honeycomb fired bodies; the number of the honeycomb fired bodies to be used is different; and the ceramic block has a substantially octagonal cross-sectional shape.

Therefore, some explanations which are overlapped with the explanations of the honeycomb structure according to the first embodiment of the present invention are omitted.

Figure 10:
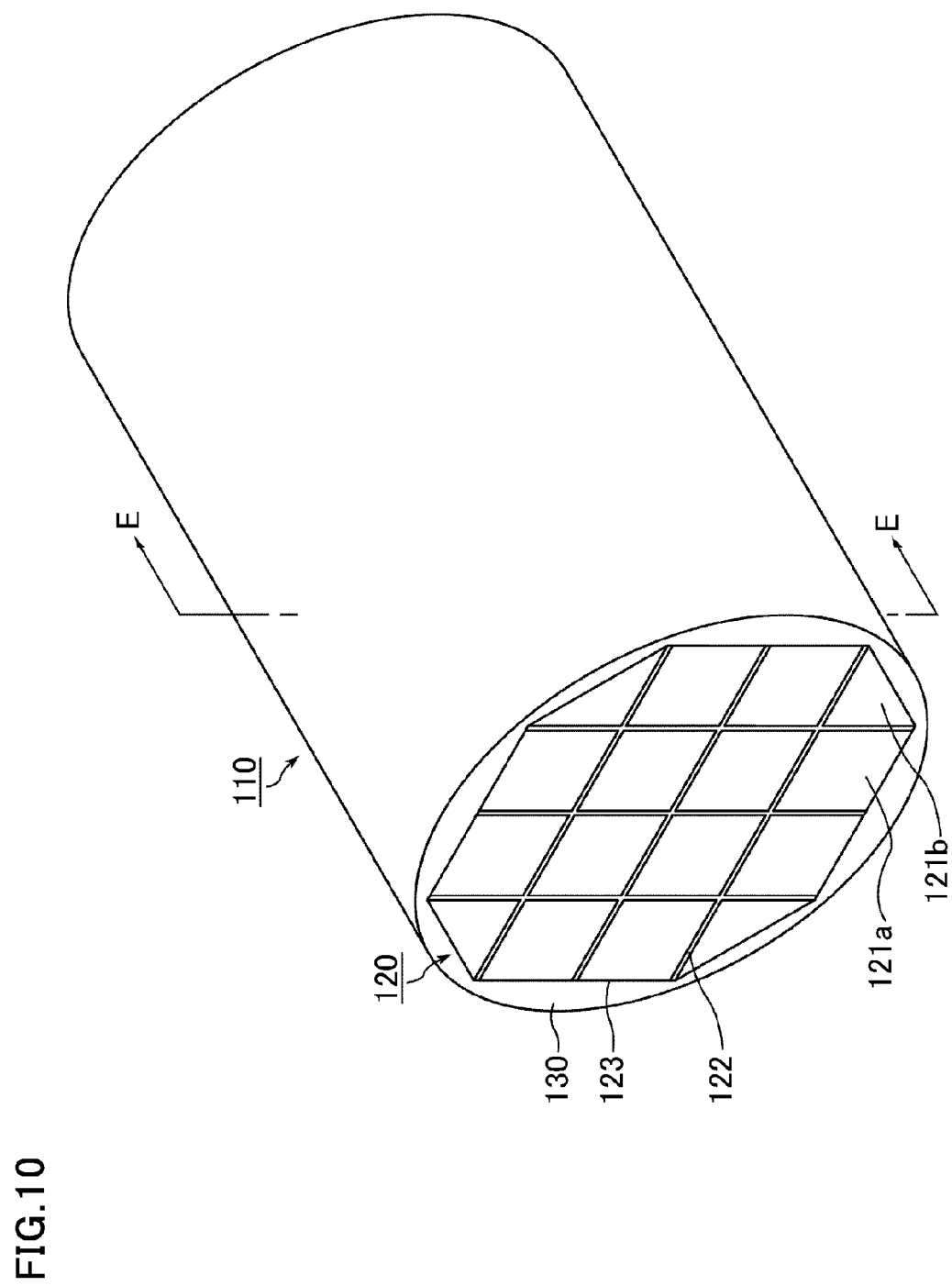
FIG. 10 is a perspective view schematically illustrating one example of a honeycomb structure of a second embodiment of the present invention.
Figure 11:
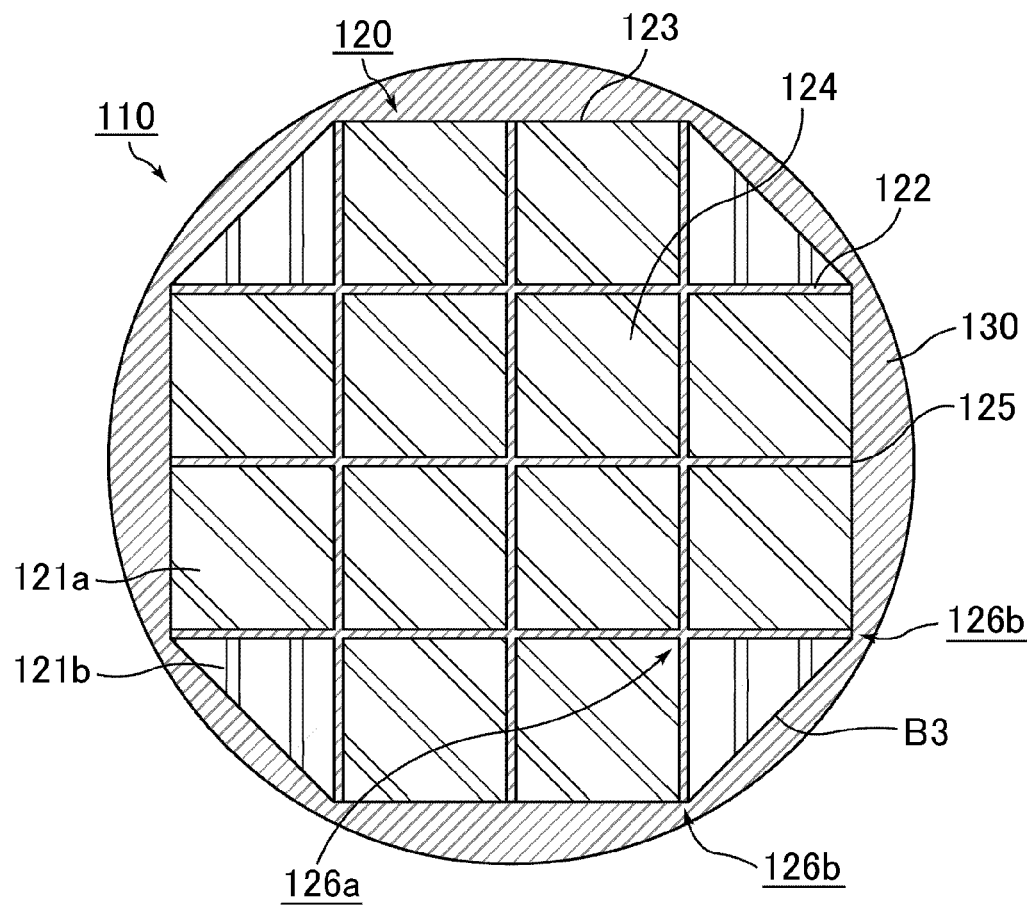
FIG. 11 is a cross sectional view taken along E-E line of the honeycomb structure illustrated in FIG. 10.

FIG. 10 is a perspective view schematically illustrating one example of a honeycomb structure of the second embodiment of the present invention. FIG. 11 is an E-E line cross-sectional view of the honeycomb structure shown in FIG. 10.

A honeycomb structure 110 according to the present embodiment shown in FIG. 10 and FIG. 11 includes a ceramic block 120 and a sealing material layer 130 formed on a peripheral face 123 of the ceramic block 120.

The ceramic block 120 includes one piece of assembly 124 of substantially square-cross-section units, the assembly having a substantially dodecagonal cross-sectional shape, and four pieces of substantially isosceles right triangular-cross-section units 121b. The ceramic block 120 has a substantially octagonal cross-sectional shape.

The assembly 124 of the substantially square-cross-section units is formed of twelve pieces of substantially square-cross-section units 121a which are bonded one another with an adhesive material layer 122 interposed therebetween.

Structures of the substantially square-cross-section unit 121a and the substantially isosceles right triangular-cross-section unit 121b are substantially the same as those of the substantially square-cross-sectional unit 21a and the substantially isosceles right triangular-cross-section unit 21b described in the first embodiment of the present invention.

Concave portions 126a and convex portions 126b are formed in a substantially step-shaped pattern on a peripheral face 125 of the assembly 124 of substantially square-cross-section units, and the concave portions 126a exist at four sites.

The substantially isosceles right triangular-cross-section unit 121b is fit in each of the four pieces of the concave portions 126a with the adhesive material layer 122 interposed therebetween.

The sealing material layer 130 having partially different thickness is formed on the peripheral face 123 of the ceramic block 120. The honeycomb structure 110 has a substantially round-pillar shape.

The method for manufacturing the honeycomb structure according to the present embodiment is substantially the same as that of the honeycomb structure according to the first embodiment of the present invention, except that twelve pieces of the substantially square-cross-section units and four pieces of the substantially isosceles right triangular-cross-section units are manufactured, and the honeycomb fired bodies are appropriately combined in the combining so that the ceramic block 120 shown in FIG. 10 and FIG. 11 is manufactured. Therefore, the explanation of the manufacturing method is omitted.

The honeycomb structure of the present embodiment can easily have the same effects (1), (3), and (4) as in the case of the first embodiment of the present invention.

Third Embodiment

The following description will discuss the third embodiment, which is one embodiment of the present invention.

According to the present embodiment, substantially square-cross-section units and substantially isosceles right triangular-cross-section units are used as honeycomb fired bodies. The present embodiment has substantially the same structure as that of the honeycomb structure described in the second embodiment of the present invention, except that a large number (32 pieces) of the honeycomb fired bodies are used.

Therefore, some explanations which are overlapped with the explanations of the honeycomb structure according to the second embodiment of the present invention are omitted.

Figure 12:
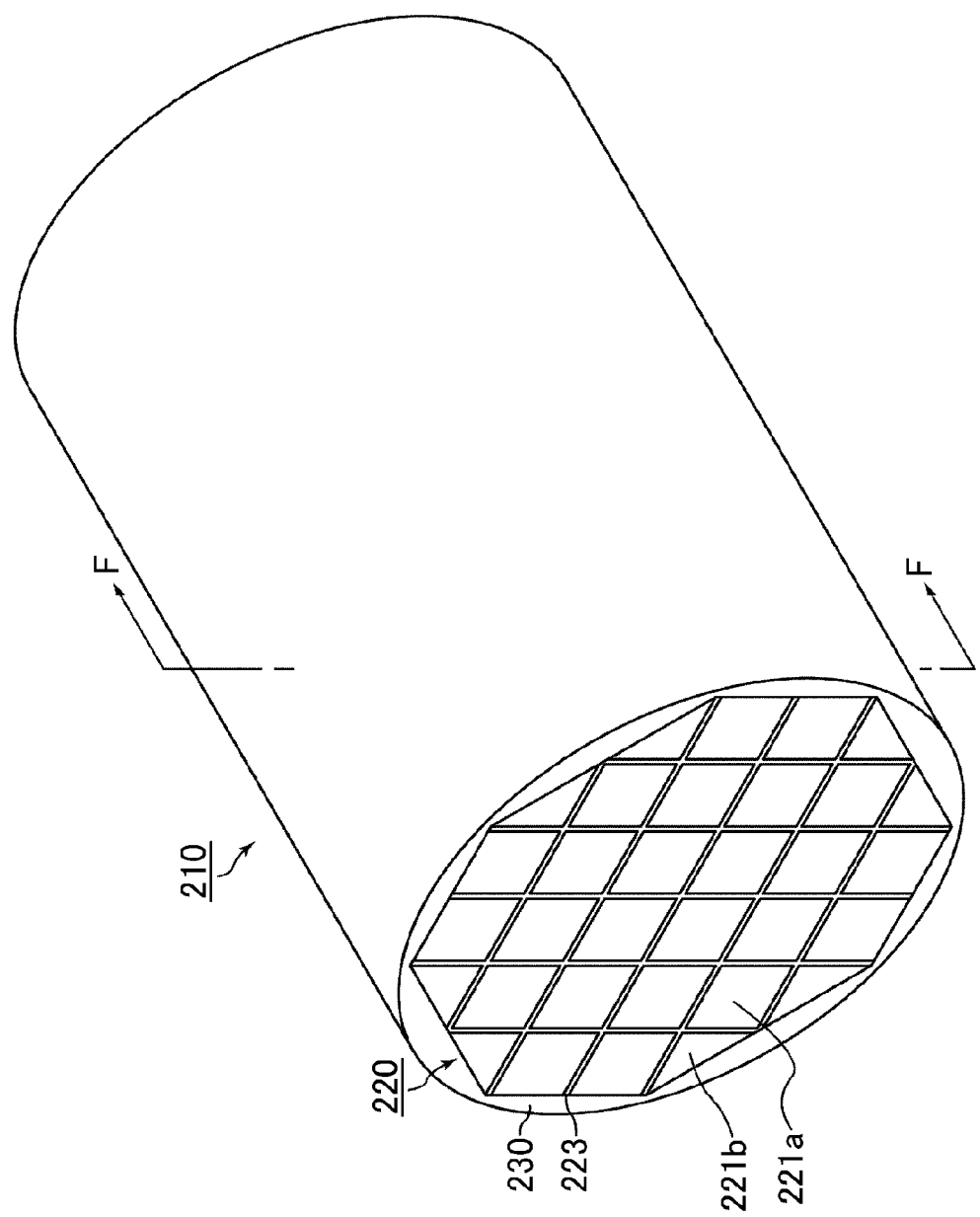
FIG. 12 is a perspective view schematically illustrating one example of a honeycomb structure of a third embodiment of the present invention.
Figure 13:
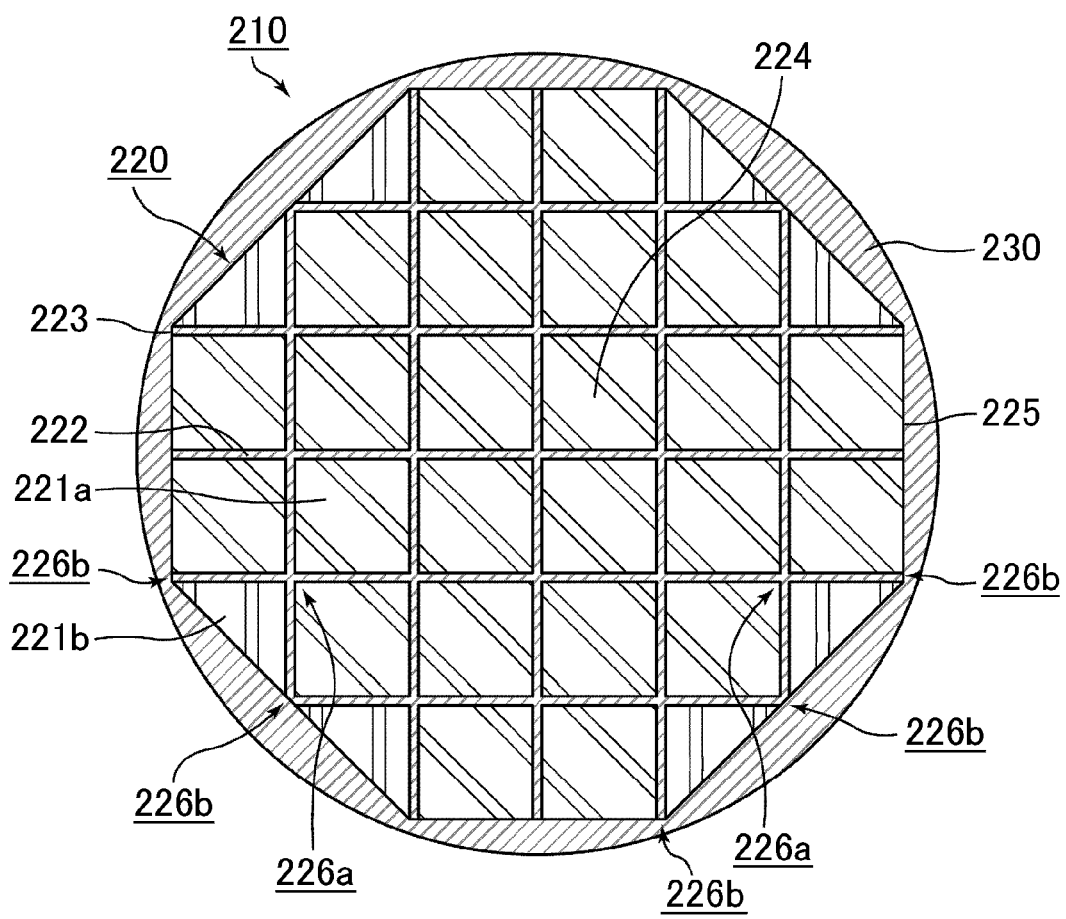
FIG. 13 is a cross sectional view taken along F-F line of the honeycomb structure illustrated in FIG. 12.

FIG. 12 is a perspective view schematically illustrating one example of a honeycomb structure of the second embodiment of the present invention. FIG. 13 is an F-F line cross-sectional view of the honeycomb structure shown in FIG. 12.

A honeycomb structure 210 according to the present embodiment shown in FIG. 12 and FIG. 13 includes a ceramic block 220 and a sealing material layer 230 formed on a peripheral face 223 of the ceramic block 220.

The ceramic block 220 includes one piece of assembly 224 of substantially square-cross-section units, the assembly having a substantially icosagonal cross-sectional shape, and eight pieces of substantially isosceles right triangular-cross-section units 221b. The ceramic block 220 has a substantially octagonal cross-sectional shape.

The assembly 224 of the substantially square-cross-section units is formed of 24 pieces of substantially square-crosssection units 221a which are bonded one another with an adhesive material layer 222 interposed therebetween.

Structures of the substantially square-cross-section unit 221a and the substantially isosceles right triangular-cross-section unit 221b are substantially the same as those of the substantially square-cross-sectional unit 21a and the substantially isosceles right triangular-cross-section unit 21b described in the first embodiment of the present invention.

Concave portions 226a and convex portions 226b are formed in a substantially step-shaped pattern on a peripheral face 225 of the assembly 224 of substantially square-cross-section units, and the concave portions 226a exist at eight sites.

The substantially isosceles right triangular-cross-section unit 221b is fit in each of the eight pieces of the concave portions 226a with the adhesive material layer 222 interposed therebetween.

The sealing material layer 230 having partially different thickness is formed on the peripheral face 223 of the ceramic block 220. The honeycomb structure 210 has a substantially round-pillar shape.

The method for manufacturing the honeycomb structure according to the present embodiment is substantially the same as that of the honeycomb structure according to the first embodiment of the present invention, except that 24 pieces of the substantially square-cross-section units and eight pieces of substantially isosceles right triangular-cross-section units are manufactured, and the honeycomb fired bodies are appropriately combined in the combining so that the ceramic block 220 shown in FIG. 12 and FIG. 13 is manufactured. Therefore, the explanation of the manufacturing method is omitted.

The honeycomb structure of the present embodiment can easily have the same effects (1), (3), and (4) as in the case of the first embodiment of the present invention.

Fourth Embodiment

The following description will discuss the fourth embodiment, which is one embodiment of the present invention.

According to the present embodiment, substantially square-cross-section units and substantially isosceles right triangular-cross-section units are used as honeycomb fired bodies. The present embodiment has substantially the same structure as that of the honeycomb structure described in the second embodiment of the present invention, except that a large number (45 pieces) of the honeycomb fired bodies are used.

Therefore, some explanations which are overlapped with the explanations of the honeycomb structure according to the second embodiment of the present invention are omitted.

Figure 14:
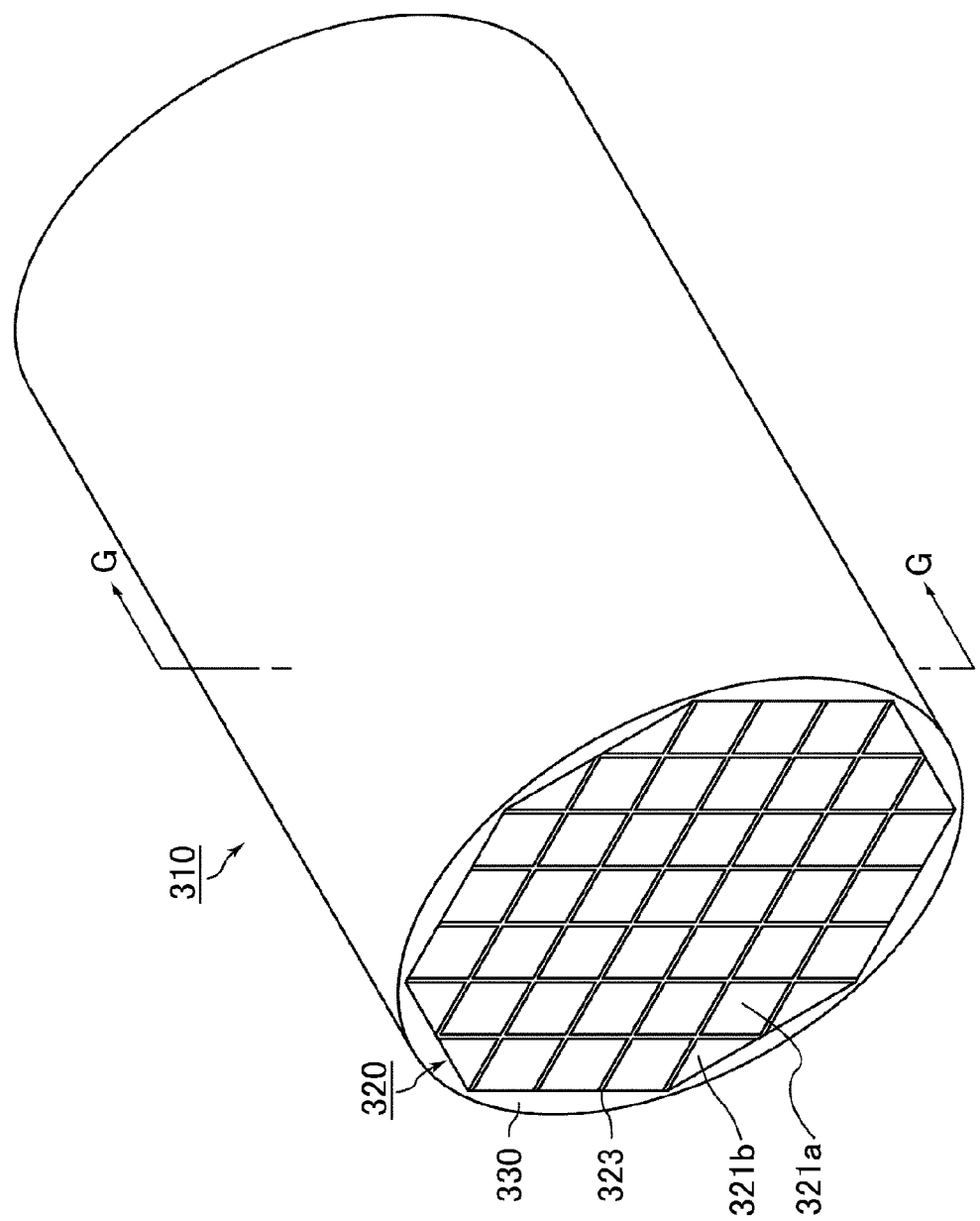
FIG. 14 is a perspective view schematically illustrating one example of a honeycomb structure of a fourth embodiment of the present invention.
Figure 15:
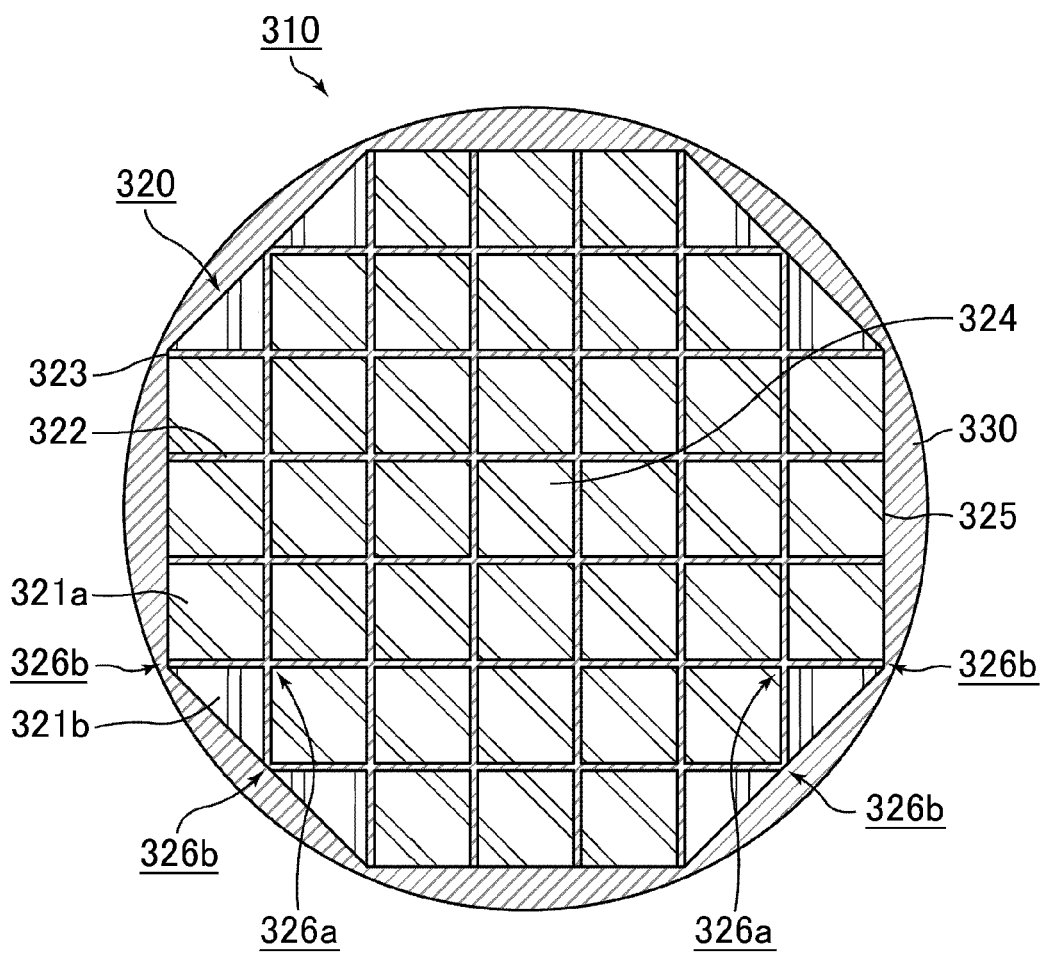
FIG. 15 is a cross sectional view taken along G-G line of the honeycomb structure illustrated in FIG. 14.

FIG. 14 is a perspective view schematically illustrating one example of a honeycomb structure according to the fourth embodiment of the present invention. FIG. 15 is an G-G line cross-sectional view of the honeycomb structure shown in FIG. 14.

A honeycomb structure 310 according to the present embodiment shown in FIG. 14 and FIG. 15 includes a ceramic block 320 and a sealing material layer 330 formed on a peripheral face 323 of the ceramic block 320.

The ceramic block 320 includes one piece of assembly 324 of substantially square-cross-section units, the assembly having a substantially icosagonal cross-sectional shape, and eight pieces of substantially isosceles right triangular-cross-section units 321b. The ceramic block 320 has a substantially octagonal cross-sectional shape.

The assembly 324 of the substantially square-cross-section units is formed of 37 pieces of substantially square-cross-section units 321a which are bonded one another with an adhesive material layer 322 interposed therebetween.

Structures of the substantially square-cross-section unit 321a and the substantially isosceles right triangular-cross-section unit 321b are substantially the same as those of the substantially square-cross-sectional unit 21a and the substantially isosceles right triangular-cross-section unit 21b described in the first embodiment of the present invention.

Concave portions 326a and convex portions 326b are formed in a substantially step-shaped pattern on a peripheral face 325 of the assembly 324 of substantially square-cross-section units, and the concave portions 326a exist at eight sites.

The substantially isosceles right triangular-cross-section unit 321b is fit in each of the eight pieces of the concave portions 326a with the adhesive material layer 322 interposed therebetween.

The sealing material layer 330 having partially different thickness is formed on the peripheral face 323 of the ceramic block 320. The honeycomb structure 310 has a substantially round-pillar shape.

The method for manufacturing the honeycomb structure according to the present embodiment is substantially the same as that of the honeycomb structure according to the first embodiment of the present invention, except that 37 pieces of the substantially square-cross-section units and eight pieces of the substantially isosceles right triangular-cross-section units are manufactured, and the honeycomb fired bodies are appropriately combined in the combining so that the ceramic block 320 shown in FIG. 14 and FIG. 15 is manufactured. Therefore, the explanation of the manufacturing method is omitted.

The honeycomb structure of the present embodiment can easily have the same effects (1), (3), and (4) as in the case of the first embodiment of the present invention.

Fifth Embodiment

The following description will discuss the fifth embodiment, which is one embodiment of the present invention.

The present embodiment has substantially the same structure as that of the honeycomb structure described in the second embodiment of the present invention, except that substantially square-cross-section units, substantially isosceles right triangular-cross-section units, and substantially quadrangular-cross-section units having a substantially rectangular cross-sectional shape (hereinafter, also simply referred to as substantially rectangular-cross-section unit) are used as honeycomb fired bodies.

Therefore, some explanations which are overlapped with the explanations of the honeycomb structure according to the second embodiment of the present invention are omitted.

Figure 16:
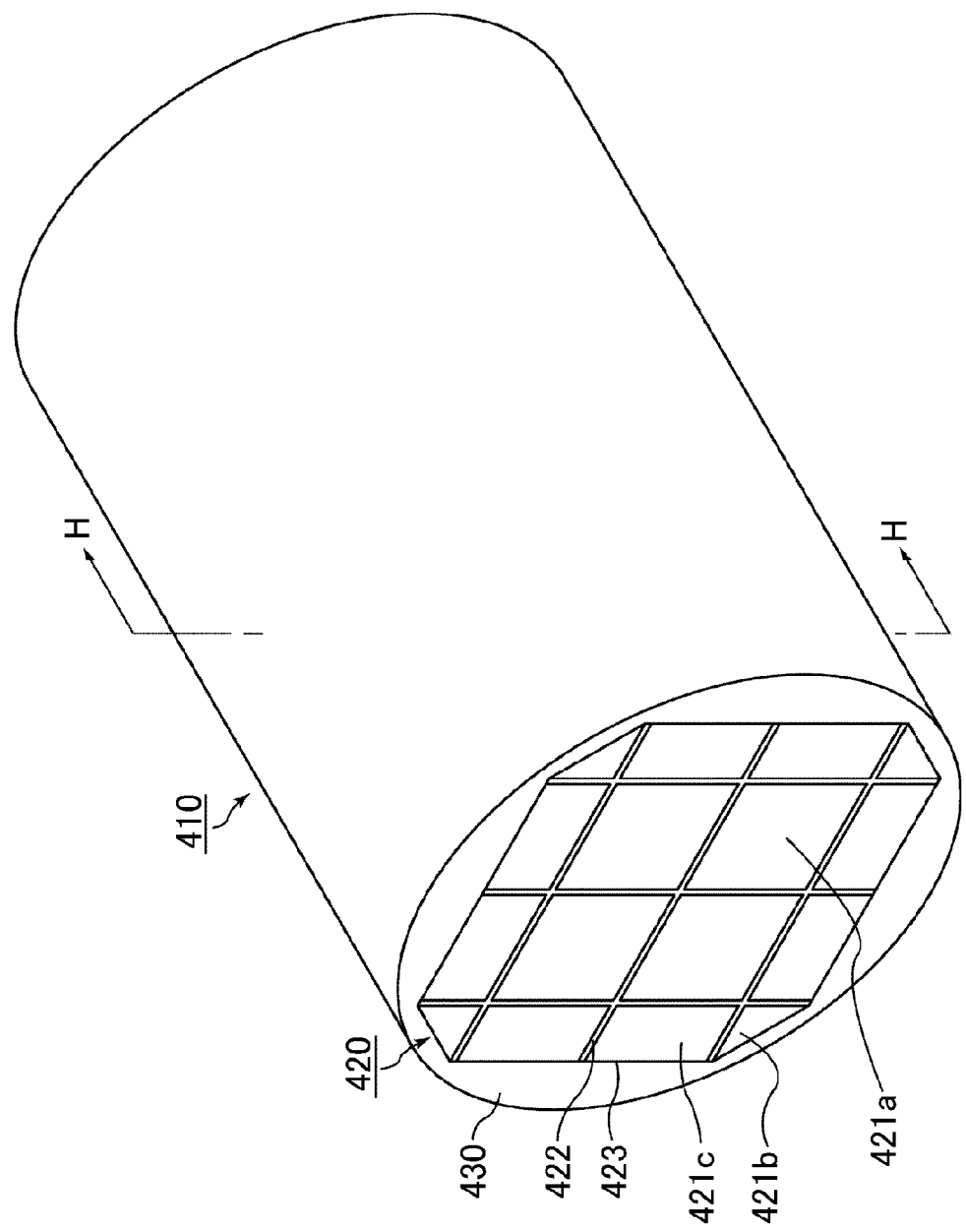
FIG. 16 is a perspective view schematically illustrating one example of a honeycomb structure of a fifth embodiment of the present invention.
Figure 17:
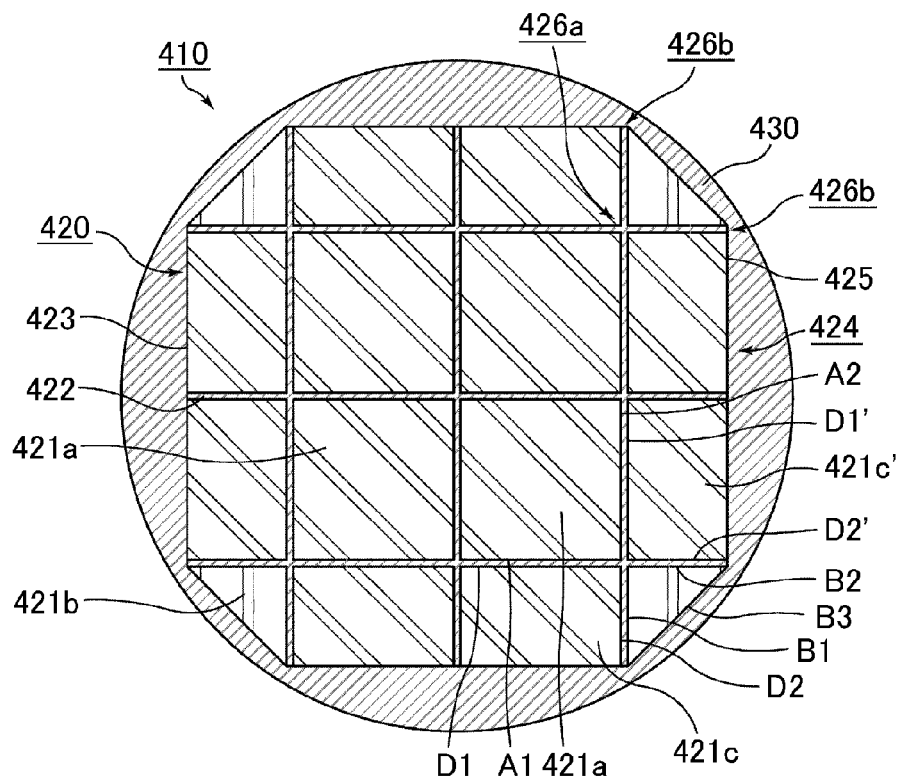
FIG. 17 is a cross sectional view taken along H-H line of the honeycomb structure illustrated in FIG. 16.

FIG. 16 is a perspective view schematically illustrating one example of a honeycomb structure of the fifth embodiment of the present invention. FIG. 17 is an H-H line cross-sectional view of the honeycomb structure shown in FIG. 16.

A honeycomb structure 410 according to the present embodiment shown in FIG. 16 and FIG. 17 includes a ceramic block 420 and a sealing material layer 430 formed on a peripheral face 423 of the ceramic block 420.

The ceramic block 420 includes one piece of assembly 424 of substantially quadrangular-cross-section units, the assembly having a substantially dodecagonal cross-sectional shape, and four pieces of substantially isosceles right triangular-cross-section units 421b. The ceramic block 420 has a substantially octagonal cross-sectional shape.

The assembly 424 of the substantially quadrangular-cross-section units is formed of four pieces of substantially square-cross-section units 421a and eight pieces of substantially rectangular-cross-section units 421c having a substantially rectangular shape in the cross section perpendicular to the longitudinal direction.

The substantially square-cross-section unit 421a has substantially the same structure as that of the substantially square-cross-sectional unit 21a described in the first embodiment of the present invention, and thus explanation thereof is omitted.

The following description will explain the structure of the substantially rectangular-cross-section unit 421c with reference to the drawings.

Figure 18:
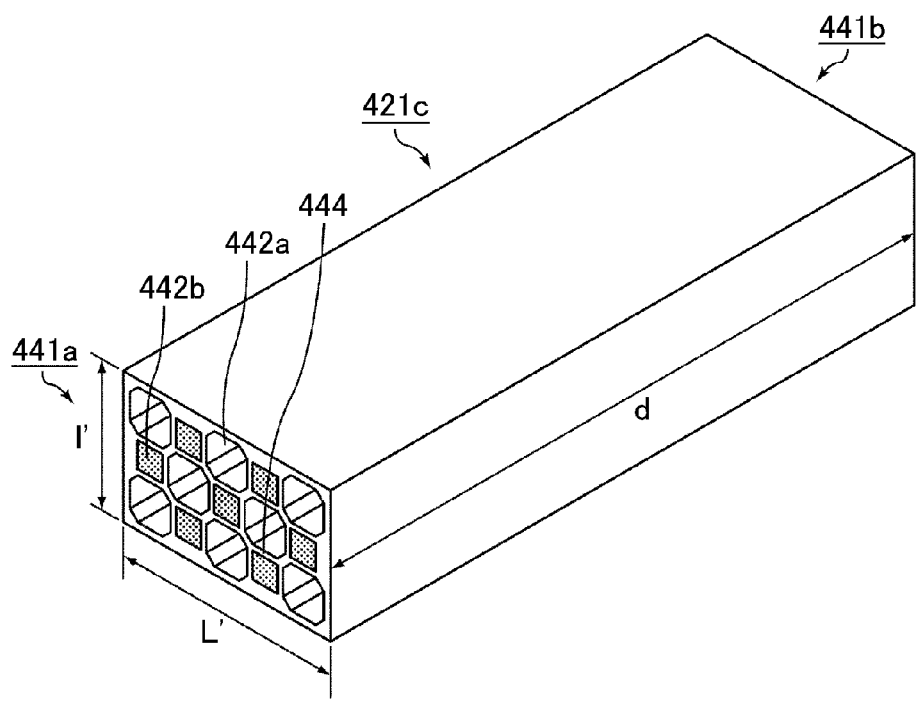
FIG. 18 is a perspective view schematically illustrating one example of a rectangular-cross-section unit, which configures the honeycomb structure of the fifth embodiment of the present invention.

FIG. 18 is a perspective view schematically illustrating one example of the substantially rectangular-cross-section unit, which configures the honeycomb structure of the fifth embodiment of the present invention.

The length of the substantially rectangular-cross-section unit 421c in the longitudinal direction (the length shown by the double-headed arrow "d" in FIG. 18) is approximately the same as the longitudinal length of the substantially square-cross-section unit 421a and the longitudinal length of the substantially isosceles right triangular-cross-section unit 421b described below.

The length of a long side L' of the substantially quadrangular-cross-section unit 421c in the cross-section perpendicular to the longitudinal direction is almost the same as the length of one side L of the substantially square-cross-section unit 421a in the cross section perpendicular to the longitudinal direction.

The length of a short side l' of the substantially quadrangular-cross-section unit 421c in the cross-section perpendicular to the longitudinal direction is approximately a half the length of one side L of the substantially square-cross-section unit 421a in the cross section perpendicular to the longitudinal direction.

The large number of cells formed in the substantially rectangular-cross-section unit 421c shown in FIG. 18 are formed in parallel with one another in the longitudinal direction with a cell wall 444 interposed therebetween substantially similarly to the foregoing substantially square-cross-section unit 21a. The large number of cells include large-capacity cells 442a having a substantially octagonal cross-sectional shape and small-capacity cells 442b having a substantially quadrangle cross-sectional shape.

In the large-capacity cell 442a, an end portion on the side of the first end face 441a is open, and an end portion on the side of the second end face 441b is sealed with a plug. In the small-capacity cell 442b, an end portion on the side of the second end face 441b is open, and an end portion on the side of the first end face 441a is sealed with a plug.

Accordingly, the cell wall 444 separating the large-capacity cell 442a and the small-capacity cell 442b functions as a filter, similarly to the substantially square-cross-section unit 21a.

The following description will explain the structures of the substantially isosceles right triangular-cross-section unit 421b and the assembly 424 of the substantially quadrangular-cross-section units with reference to FIG. 17.

The substantially isosceles right triangular-cross-section unit 421b has substantially the same structure as that of the substantially isosceles-right triangular unit 21b in the first embodiment of the present invention, except that the length of a side forming the first side surface B1 and the length of a side forming the second side surface B2 in the cross-section perpendicular to the longitudinal direction are approximately the same with the length of a short side l' of the substantially rectangular-cross-section unit 421c in the cross section perpendicular to the longitudinal direction.

In the assembly 424 of the substantially quadrangular-cross-section units shown in FIG. 17, four pieces of the substantially square-cross-section units 421a are combined with one another with the adhesive layer 422 interposed therebetween in a manner to form a substantially square shape in the cross section. The first side surface A1 of one of the combined substantially square-cross-section units 421a is connected to a long side surface D1 of the first substantially rectangular-cross-section unit 421c with the adhesive layer 422 interposed therebetween, and the second side surface A2 of the one substantially square-cross-section unit 421a is connected to a long side surface D1' of a second substantially rectangular-cross-section unit 421c' with the adhesive layer 422 interposed therebetween. Similarly, total eight pieces of the substantially rectangular-cross-section units 421c are connected to the substantially square-cross-section units 421a with the adhesive layer 422 interposed therebetween.

The assembly 424 of the substantially quadrangular-cross-section units having the above structure has a substantially dodecagonal cross-sectional shape.

Moreover, concave portions 426a and convex portions 426b are substantially step-shaped formed on the peripheral face 425 of the assembly 424 of the substantially quadrangular-cross-section units, and the concave portions 426a exist at four sites.

In a detailed structure of one of the concave portions 426a, a first short side surface D2 of the first substantially rectangular-cross-section unit 421c and the first side surface B1 of the substantially isosceles right triangular-cross-section unit 421b are connected to one another with the adhesive layer 422 interposed therebetween, and a second short side surface D2' of the second substantially rectangular-cross-section unit 421c' and the second side surface B2 of the substantially isosceles right triangular-cross-section unit 421b are connected to one another with the adhesive layer 422 interposed therebetween. The third side surface B3 of the substantially isosceles right triangular-cross-section unit 421b forms the peripheral face 423 of the ceramic block 420.

Almost the same relations exist between other concave portions and the substantially triangular-cross-section units. The substantially isosceles right triangular-cross-section unit 421b is fit in each of the four concave portions 426b with the adhesive layer 422 interposed therebetween.

The sealing material layer 430 having partially different thickness is formed on the peripheral face 423 of the ceramic block 420. The honeycomb structure 410 has a substantially round pillar shape.

The method for manufacturing the honeycomb structure according to the present embodiment is substantially the same as that of the honeycomb structure according to the first embodiment of the present invention, except that four pieces of the substantially square-cross-section units, four pieces of the substantially isosceles right triangular-cross-section units, and eight pieces of the substantially rectangular-cross-section units are manufactured, and the honeycomb fired bodies are appropriately combined in the combining so that the ceramic block 420 shown in FIG. 16 and FIG. 17 is manufactured. Therefore, the explanation of the manufacturing method is omitted.

In order to manufacture a honeycomb molded body which turns to be the substantially rectangular-cross-section unit having a substantially rectangular shape in the cross-section perpendicular to the longitudinal direction, an appropriate die for extrusion-molding may be used depending on the shapes of the honeycomb molded body to be manufactured.

The honeycomb structure of the present embodiment can easily have the same effects (1), (3), and (4) as in the case of the first embodiment of the present invention.

Sixth Embodiment

The following description will discuss the sixth embodiment, which is one embodiment of the present invention.

The present embodiment uses substantially square-cross-section units, substantially triangular-cross-section units, and substantially rectangular-cross-section units as honeycomb fired bodies, and has substantially the same structure as that of the honeycomb structure described in the fifth embodiment of the present invention, except that: the substantially triangular-cross-section units have substantially the same shape as that of the substantially isosceles right triangular-cross-section units described in the first embodiment of the present invention; the number of the honeycomb fired bodies forming the ceramic block is 116 pieces; the ceramic block has a substantially tricontadigonal cross-sectional shape; and how to combine the honeycomb fired bodies is different as described below.

Therefore, some explanations which are overlapped with the explanations of the honeycomb structure according to the fifth embodiment of the present invention are omitted.

Figure 19:
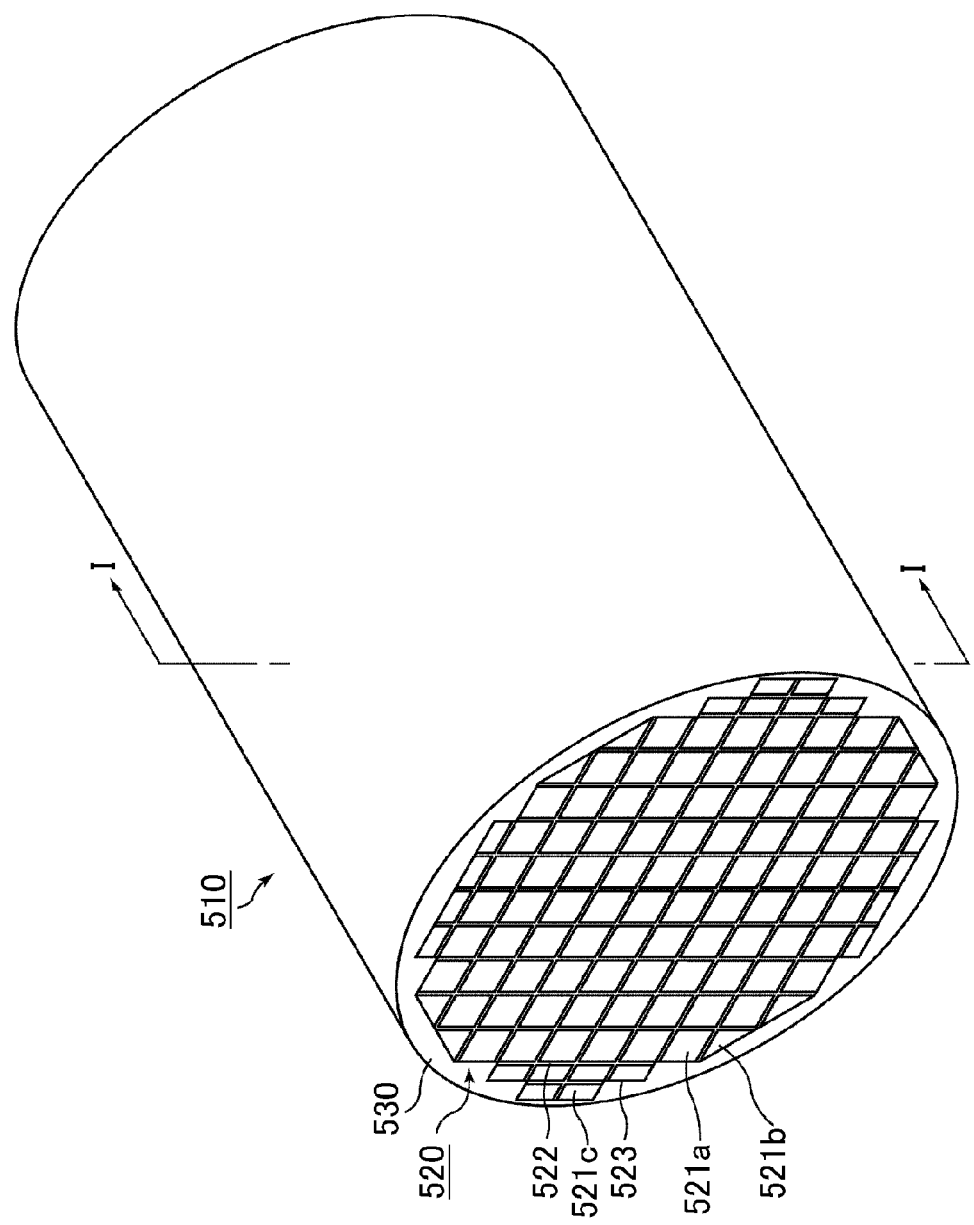
FIG. 19 is a perspective view schematically illustrating one example of a honeycomb structure of a sixth embodiment of the present invention.
Figure 20:
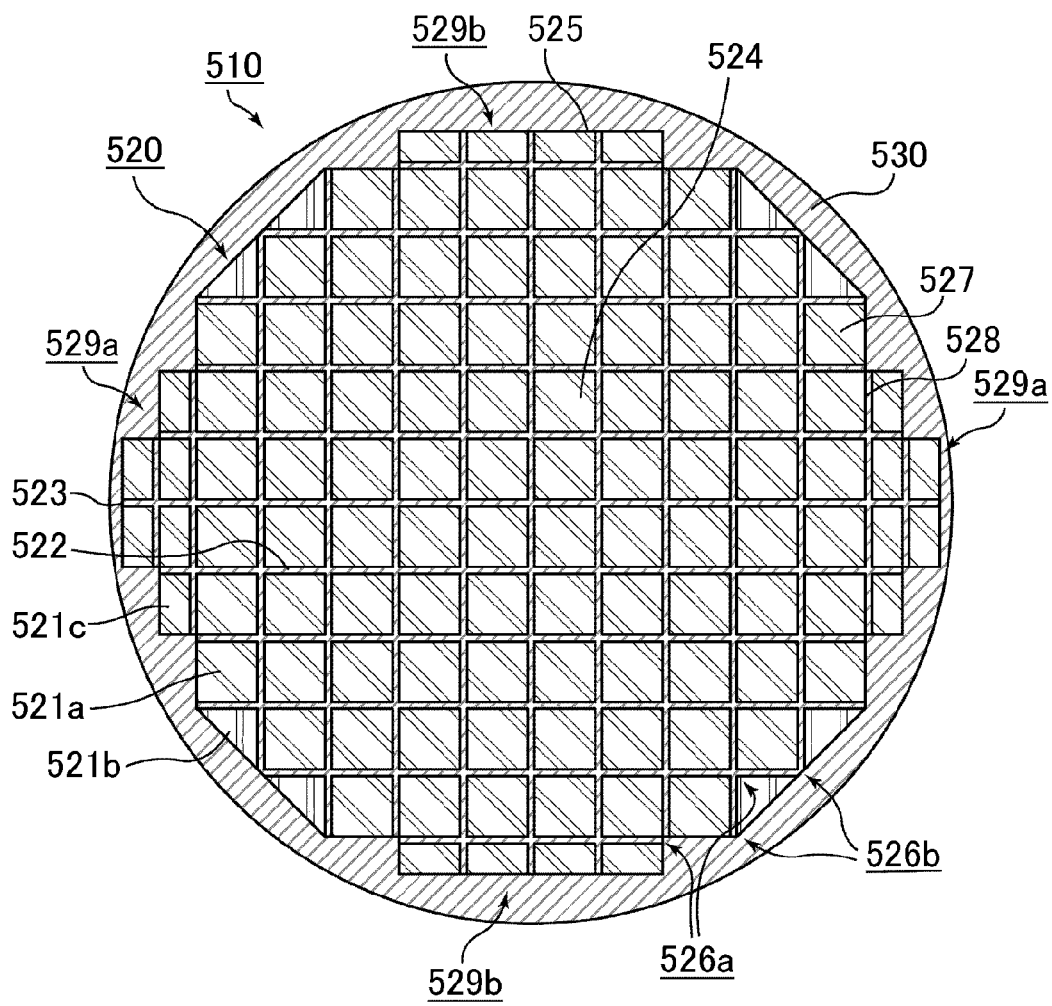
FIG. 20 is a cross sectional view taken along I-I line of the honeycomb structure illustrated in FIG. 19.

FIG. 19 is a perspective view schematically illustrating one example of a honeycomb structure of the sixth embodiment of the present invention. FIG. 20 is an I-I line cross-sectional view of the honeycomb structure shown in FIG. 19.

A honeycomb structure 510 according to the present embodiment shown in FIG. 19 and FIG. 20 includes a ceramic block 520 and a sealing material layer 530 formed on a peripheral face 523 of the ceramic block 520.

The ceramic block 520 includes one piece of assembly 524 of substantially quadrangular-cross-section units, the assembly having a shape with about 44 corners in the cross section, and eight pieces of substantially isosceles right triangular-cross-section units 521b. The ceramic block 520 has a substantially tricontadigonal cross-sectional shape.

The assembly 524 of the substantially quadrangular-cross-section units is formed of one piece of assembly 527 of substantially square-cross-section units, in which 88 pieces of substantially square-cross-section units 521a are combined with one another with the adhesive layer 522 interposed therebetween, and four pieces of assemblies 529 of substantially rectangular-cross-section units which are respectively connected to peripheral faces 528 of the assembly 527 of substantially square-cross-section units with the adhesive layer 522 interposed therebetween. Among the substantially rectangular-cross-section units 529, two pieces of assemblies 529a of substantially rectangular-cross-section units each include six pieces of substantially rectangular-cross-section units 521c and the other two pieces of assemblies 529b of substantially rectangular-cross-section units 529b each include four pieces of substantially rectangular-cross-section units 521c. Specifically, the assembly 529 of substantially rectangular-cross-section units includes a total of 20 pieces of the substantially rectangular-cross-section units 521c.

Structures of the substantially square-cross-section unit 521a and the substantially isosceles right triangular-cross-section unit 521b are respectively substantially the same as the structures of the substantially square-cross-section unit 21a and the substantially isosceles-cross-section unit 21b explained in the first embodiment of the present invention. Moreover, the structure of the substantially rectangular-cross-section unit 521c is substantially the same as that of the substantially rectangular-cross-section unit 421c explained in the fifth embodiment of the present invention.

Concave portions 526a and convex portions 526b are substantially step-shaped formed on the peripheral face 525 of the assembly 524 of substantially quadrangular-cross-section units, and the concave portions 526a exist at twenty sites.

The substantially isosceles right triangular-cross-section unit 521b is fit in each of eight sites of the concave portions 526a with the adhesive layer 522 interposed therebetween, among the twenty sites of the concave portions 526a.

The sealing material layer 530 having partially different thickness is formed on the peripheral face 523 of the ceramic block 520. The honeycomb structure 510 has a substantially round pillar shape.

The method for manufacturing the honeycomb structure according to the present embodiment is substantially the same as that of the honeycomb structure according to the fifth embodiment of the present invention, except that 88 pieces of the substantially square-cross-section units, eight pieces of the substantially isosceles right triangular-cross-section units, and 20 pieces of the substantially rectangular-cross-section units are manufactured, and the honeycomb fired bodies are appropriately combined in the combining so that the ceramic block 520 shown in FIG. 19 and FIG. 20 is manufactured. Therefore, the explanation of the manufacturing method is omitted.

The honeycomb structure of the present embodiment can easily have the same effects (1), (3), and (4) as in the case of the first embodiment of the present invention.

Other Embodiments

In the honeycomb structure of the embodiments of the present invention, the substantially quadrangular-cross-section is not limited to the substantially square-cross-section unit or the substantially rectangular-cross-section unit, and may be a substantially quadrangular-cross-section unit having such cross-sectional shapes as a substantially rhombic cross-sectional shape and a substantially parallelogram cross-sectional shape, a substantially quadrangular-cross-section unit having the same cross-sectional shape as that mentioned earlier.

In the honeycomb structure of the embodiments of the present invention, the substantially triangular-cross-section unit is not limited to the substantially isosceles right triangular-cross-section unit, and may have any shape as long as it may be fit in the concave portion formed on the peripheral face of the assembly of the substantially quadrangular-cross-section units. For example, the substantially triangular-cross-section unit may be a substantially triangular-cross-section unit having a substantially right triangular cross-sectional shape, a substantially isosceles triangular cross-sectional shape, and a substantially equilateral triangle cross-sectional shape, and a substantially triangular-cross-section unit having the same cross-sectional shape as those described earlier.

As the irregular-cross-section unit in the honeycomb structure of the embodiments of the present invention, such units as a unit with a substantially fan-shaped cross section mentioned below or a unit with a substantially trapezoidal cross section mentioned below may be used without being limited to the substantially trapezoidal cross section unit.

FIG. 1A, FIG. 1B, FIG. 1C, FIG. 1D, and FIG. 1E are side views each schematically illustrating one example of the irregular-cross-section unit of the honeycomb structure of the embodiment of the present invention.

Figure 1B:
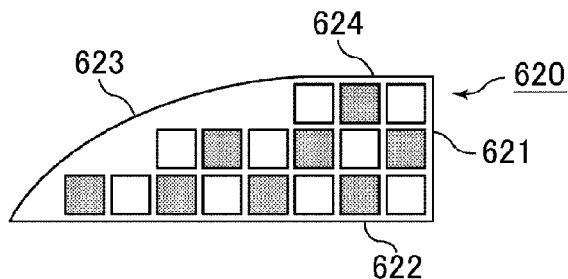
Figure 1C:
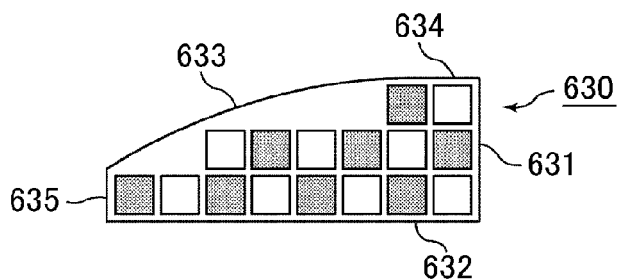
Figure 1D:
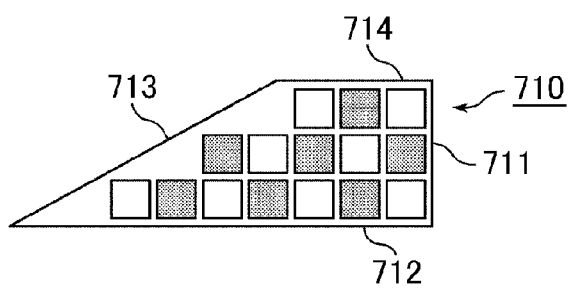
Figure 1E:
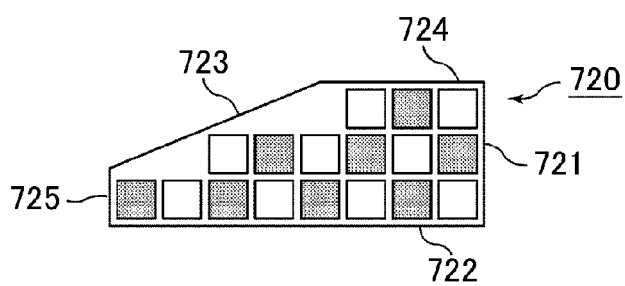

FIG. 1A, FIG. 1B, and FIG. 1C each illustrate a unit with a substantially fan-shaped cross section. FIG. 1D and FIG. 1E each illustrate a unit with a substantially trapezoidal cross section.

Each substantially fan-shaped-cross-section unit and each substantially trapezoidal-cross-section unit as irregular-cross-section unit shown in each drawing in FIG. 1A to FIG. 1E may include a cell having a substantially quadrangular shape in the cross-section perpendicular to the longitudinal direction, in place of the large-capacity cells and the small-capacity cells.

The cells in the honeycomb structure of the embodiments of the present invention may include a combination of the large-capacity cells and the small-capacity cells, or may include cells having substantially the same cross-sectional area in the cross section perpendicular to the longitudinal direction. In the case of the cells having substantially the same cross-sectional area in the cross section perpendicular to the longitudinal direction, the shape of the cross-section perpendicular to the longitudinal direction may be any shape such as a substantially quadrangular shape.

As the substantially fan-shaped-cross-section unit as irregular-cross-section unit, examples of the shape in the cross section perpendicular to the longitudinal direction include: a shape formed by one circular arc and two straight line portions; a shape formed by one circular arc and three straight line portions; a shape formed by one circular arc and four straight line portions, and the like. The number of the circular arc may be two or more, and the number of the straight line portions may be five or more, as long as the shape of the substantially fan-shaped-cross-section unit in the cross section perpendicular to the longitudinal direction at least has one circular arc and two straight line portions.

FIG. 1A illustrates one example of a unit with a substantially fan-shaped cross section, whose shape in the cross section perpendicular to the longitudinal direction is formed by one circular arc and two straight line portions. In a unit with a substantially fan-shaped cross section 610 illustrated in FIG. 1A, the shape in the cross section perpendicular to the longitudinal direction has a first side 611, a second side 612, and an inclined side 613.

The angle made by the first side 611 and the second side 612 is a substantially right angle, and the inclined side 613 faces the substantially right angle. The inclined side 613 is a circular arc.

The inclined side 613 is connected to the first side 611 and the second side 612.

FIG. 1B illustrates one example of a unit with a substantially fan-shaped cross section, whose shape in the cross section perpendicular to the longitudinal direction is formed by one circular arc and three straight line portions.

In a unit with a substantially fan-shaped cross section 620 illustrated in FIG. 1B, the shape in the cross section perpendicular to the longitudinal direction has a first side 621, a second side 622, an inclined side 623, and a third side 624.

The angle made by the first side 621 and the second side 622 is a substantially right angle, and the inclined side 623 faces the substantially right angle. The inclined side 623 is a circular arc.

The third side 624 is a side that connects the inclined side 623 to the first side 621, and is substantially parallel to the second side 622.

FIG. 1C illustrates one example of a unit with a substantially fan-shaped cross section, whose shape in the cross section perpendicular to the longitudinal direction is formed by one circular arc and four straight line portions. In a unit with a substantially fan-shaped cross section 630 illustrated in FIG. 1C, the shape in the cross section perpendicular to the longitudinal direction has a first side 631, a second side 632, an inclined side 633, a third side 634, and a fourth side 635.

The angle made by the first side 631 and the second side 632 is a substantially right angle, and the inclined side 633 faces the substantially right angle. The inclined side 633 is a circular arc.

The third side 634 is a side that connects the inclined side 633 to the first side 631, and is substantially parallel to the second side 632.

The fourth side 635 is a side that connects the inclined side 633 to the second side 632, and is substantially parallel to the first side 631.

As the unit with a substantially trapezoidal cross section as irregular-cross-section unit, examples of the shape in the cross section perpendicular to the longitudinal direction include: a shape formed by four straight line portions; a shape formed by five straight line portions, and the like.

In the shape of the unit with a substantially trapezoidal cross-section, the number of the inclined side may be two or more, and the number of the straight line portion may be six or more, provided that the straight line portions at least include one inclined side and two other sides (first and second sides). Here, the cross-sectional shape of the "unit with a substantially trapezoidal cross section" is not limited to a substantially trapezoidal shape, and may be a substantially polygonal shape such as a substantially pentagonal or hexagonal shape.

FIG. 1D illustrates one example of a unit with a substantially trapezoidal cross section, whose shape in the cross section perpendicular to the longitudinal direction is formed by four straight line portions. In a unit with a substantially trapezoidal cross section 710 illustrated in FIG. 1D, the shape in the cross section perpendicular to the longitudinal direction has a first side 711, a second side 712, an inclined side 713, and a third side 714.

The angle made by the first side 711 and the second side 712 is a substantially right angle, and the inclined side 713 faces the substantially right angle. The inclined side 713 is a straight line.

The third side 714 is a side that connects the inclined side 713 to the first side 711, and is substantially parallel to the second side 712.

FIG. 1E illustrates one example of a unit with a trapezoidal cross section, whose shape in the cross section perpendicular to the longitudinal direction is formed by five straight line portions. In a unit with a substantially trapezoidal cross section 720 illustrated in FIG. 1E, the shape in the cross section perpendicular to the longitudinal direction has a first side 721, a second side 722, an inclined side 723, a third side 724, and a fourth side 725.

The angle made by the first side 721 and the second side 722 is a substantially right angle. The inclined side 723 faces the substantially right angle. The inclined side 723 is a straight line.

The third side 724 is a side that connects the inclined side 723 to the first side 721, and is substantially parallel to the second side 722.

The fourth side 725 is a side that connects the inclined side 723 to the second side 722, and is substantially parallel to the first side 721.

In the honeycomb structure of the embodiments of the present invention, intersections of each side in the cross sectional shape of the honeycomb fired body may be corners as the substantially square-cross-section unit shown in FIG. 7A and FIG. 7B. The positions corresponding to the corners of the honeycomb fired body may have chamfered faces as well.

The shape having a chamfered face in a position corresponding to a corner of the honeycomb fired body refers to, for example, an R-chamfered shape having an arc curve at position corresponding a corner of the periphery of the honeycomb fired body, or a C-chamfered shape in which the corner position of the honeycomb fired body is chamfered to be linearly cut off so that all remaining angles are obtuse.

With respect to the R-dimension of the R-chamfered face and the C-dimension of the C-chamfered face, the lower limit value is preferably set to about 0.3 mm, and more preferably set to about 0.5 mm. Meanwhile, the upper limit value is preferably set to about 2.5 mm.

The R-dimension or C-dimension of the corner of the honeycomb fired body of about 0.3 mm or more tend to prevent a thermal stress from concentrating on each of the corners of the honeycomb fired body, and also tends to improve the flowability of a gas in a cell placed on each of the corner portions of the corners of the honeycomb fired body. With respect to a cell positioned on the corner of the corners of the honeycomb fired body, the R-dimension or C-dimension of the corner of the honeycomb fired body of about 2.5 mm or less does not make the roundness of each of the corner portions of the corners of the honeycomb fired body become too large so that a corner portion having an acute angle is less likely to be generated, with the result that cracks of the corners of the honeycomb fired body tend not to occur easily on the contrary.

The R-dimension refers to a radius of the arc in the R-chamfered face. The C-dimension refers to a cut-out length with respect to the longer side of two sides which are cut out by the C-chamfering process and originally form the corner.

In the cross-section of the honeycomb structure of the embodiments of the present invention, the proportion of the area occupied by the units (the honeycomb fired bodies), (i.e. the occupancy of the honeycomb fired bodies) is preferably from about 87% to about 93%.

In the case that the large number of cells include large-capacity cells and small-capacity cells, the area ratio of the large-capacity cells in a cross section perpendicular to the longitudinal direction to the small-capacity cells in a cross section perpendicular to the longitudinal direction is preferably from about 1.4 to about 2.4.

The ratio easily improves the PM-capturing efficiency when the large-capacity cells and the small-capacity cells are provided.

The shape of the cells in each of the honeycomb fired bodies is not limited to the shapes explained in the embodiments of the present invention.

FIG. 2A, FIG. 2B, FIG. 2C, and FIG. 2D are side views each schematically illustrating one example of an end face of the substantially square-cross-section unit according to the honeycomb structure of the embodiments of the present invention.

The shapes of the cells shown in the figures are a shape in which a large-capacity cell and a small-capacity cell are alternately disposed.

A honeycomb fired body 820 shown in FIG. 2A has a substantially quadrangular shape in which each of the portions corresponding to corners in the cross section perpendicular to the longitudinal direction of large-capacity cells 821a has a circular-arc shape. The cross-sectional shape of small-capacity cells 821b in the cross section perpendicular to the longitudinal direction is substantially quadrangle.

Figure 2B:
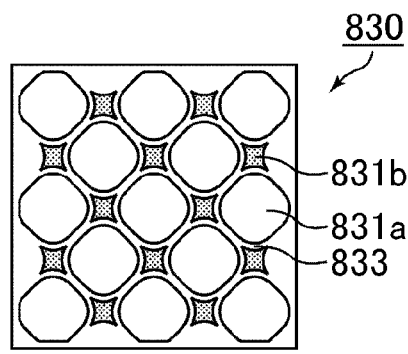

In a honeycomb fired body 830 illustrated in FIG. 2B, the cross-sectional faces perpendicular to the longitudinal direction of a large-capacity cell 831a and a small-capacity cell 831b are shapes in which each side of the cell is formed by a curved line.

Specifically, in FIG. 2B, the cross-sectional shape of a cell wall 833 is a curved line.

In the shape of the cross section of the large-capacity cells 831a, the cell wall 833 is convex from the center to the outside of the cross section of the cell.

Whereas, in the shape of the cross section of the small-capacity cells 831b, the cell wall 833 is convex from the outside to the center of the cross section of the cell.

The cell wall 833 has a wave shape that rises and falls in the horizontal and vertical directions of the cross section of the honeycomb fired body. Mountain portions (portions that exhibits the maximum amplitude in the sine curve) of the wave shape of the adjacent cell walls 833 make their closest approach to one another, whereby large-capacity cells 831a whose cross section is dented outward and small-capacity cells 831b whose cross section is dented inward are formed. The amplitude of the wave shape may be substantially constant or variable, but preferably is substantially constant.

Figure 2C:
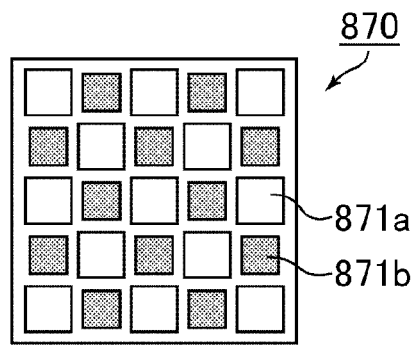

In the honeycomb fired body 870 illustrated in FIG. 2C, the cross section each of the large-capacity cells 871a perpendicular to the longitudinal direction has a substantially quadrangular shape, and the cross section of each of the small-capacity cells 871b perpendicular to the longitudinal direction has a substantially quadrangular shape.

Figure 2D:
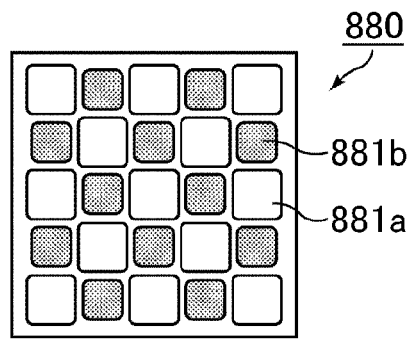

In the honeycomb fired body 880 illustrated in FIG. 2D, the cross section of the large-capacity cells 881a and the small-capacity cells 881b perpendicular to the longitudinal direction has a substantially quadrangular shape in which portions equivalent to corners have a circular-arc shape.

When the honeycomb fired bodies include the large-capacity cells and the small-capacity cells, a distance between centers of gravity of adjacently located large-capacity cells in the cross section perpendicular to the longitudinal direction is preferably substantially equal to a distance between centers of gravity of adjacently located small-capacity cells in the cross section perpendicular to the longitudinal direction.

The "distance between centers of gravity of adjacently located large-capacity cells in the cross section perpendicular to the longitudinal direction" means the minimum distance between a center of gravity of a large-capacity cell in the cross section perpendicular to the longitudinal direction and a center of gravity of an adjacent large-capacity cell in the cross section perpendicular to the longitudinal direction. On the other hand, the "distance between centers of gravity of adjacently located small-capacity cells in the cross section perpendicular to the longitudinal direction" means the minimum distance between a center of gravity of a small-capacity cell in the cross section perpendicular to the longitudinal direction and a center of gravity of an adjacent small-capacity cell in the cross section perpendicular to the longitudinal direction.

When the two distances between centers of gravity are substantially equal to each other, heat tends to diffuse homogeneously upon regeneration of a honeycomb structure, whereby a local dispersion of temperature is more likely to disappear in the honeycomb structure. Hence, such a honeycomb structure being excellent in durability, i.e. where no cracks and the like are less likely to appear due to a thermal stress even if it is repeatedly used for a long period of time, is obtained.

The case where the cells in the honeycomb fired body are composed of the large-capacity cells and the small-capacity cells is mentioned above with the substantially square-cross-section unit taken as an example, but honeycomb fired bodies such as substantially triangular-cross-section units and substantially rectangular-cross-section units may include a large-capacity cell and a small-capacity cell.

FIG. 3A, FIG. 3B, FIG. 3C, and FIG. 3D are side views each schematically illustrating one example of an end face of the irregular-cross-section unit in accordance with the honeycomb structure of the embodiments of the present invention.

Irregular-cross-section units 910, 920, 960, and 970 illustrated in these figures include large-capacity cells 911a, 921a, 961a, and 971a, and small-capacity cells 911b, 921b, 961b and 971b, respectively. The large-capacity cells and the respective small-capacity cells are alternately disposed.

The shapes of the large-capacity cells and the small-capacity cells are substantially the same as in the substantially square-cross-section unit, and therefore the detail description thereof is omitted.

FIG. 4A, FIG. 4B, FIG. 4C, and FIG. 4D are side views each schematically illustrating one example of an end face of the triangular-cross-section unit in accordance with the honeycomb structure of the embodiments of the present invention.

Substantially triangular-cross-section units 1010, 1020, 1060, and 1070 illustrated in these figures include large-capacity cells 1011a, 1021a, 1061a, and 1071a, and small-capacity cells 1011b, 1021b, 1061b and 1071b, respectively. The large-capacity cells and the respective small-capacity cells are alternately disposed.

The shapes of the large-capacity cells and the small-capacity cells are substantially the same as in the substantially square-cross-section unit, and therefore the detail description thereof is omitted.

In the honeycomb structure of the embodiments of the present invention, the cell wall thickness of the honeycomb fired body is not particularly limited, and preferably is from about 0.2 mm to about 0.4 mm.

If the thickness of the cell wall of the honeycomb fired body is about 0.2 mm or more, the cell wall is less likely to be so thin that it can more easily maintain the strength of the honeycomb fired body. If the thickness of the cell wall of the honeycomb fired body is about 0.4 mm or less, pressure loss of the honeycomb structure is less likely to increase.

In the honeycomb structure of the embodiments of the present invention, the cell density in the cross section is not particularly limited. A desirable lower limit is about 31 pcs/cm$^2$ (about 200 pcs/in$^2$) and a desirable upper limit is about 93 pcs/cm$^2$ (about 600 pcs/in$^2$). A more desirable lower limit is about 38.8 pcs/cm$^2$ (about 250 pcs/in$^2$) and a more desirable upper limit is about 77.5 pcs/cm$^2$ (about 500 pcs/in$^2$).

The cross-sectional shape of the honeycomb structure according to the embodiments of the present invention is not limited to a substantially round (circle) shape, and may be, for example, a substantially elliptical shape, a substantially flat oval shape, a substantially triangular shape whose apexes have a curved shape, or the like.

In the honeycomb structure of the embodiments of the present invention, the porosity of the honeycomb fired body is not particularly limited, and is preferably from about 35% to about 60%.

When the honeycomb structure that is configured by the honeycomb fired bodies is used as a filter, a porosity of the honeycomb fired body of about 35% or more tends not to cause clogging in the honeycomb fired body, while a porosity of the honeycomb fired body of about 60% or less tends not to cause a decrease in strength of the honeycomb fired body with the result that the honeycomb fired body is less likely to be easily broken.

The average pore diameter of the honeycomb fired body of the embodiments of the present invention is desirably from about 5 μm to about 30 μm.

When the honeycomb structure that is configured by the honeycomb fired bodies is used as a filter, an average pore diameter of the honeycomb fired body of about 5 μm or more tends not to easily cause clogging in the honeycomb fired body. On the other hand, the honeycomb fired body with an average pore diameter of about 30 μm or less is less likely to allow particulates to pass through the pores of the honeycomb fired body, and the particulates can be easily captured, and as a result, the honeycomb fired body is more likely to sufficiently function as a filter.

Here, the above-mentioned porosity and pore diameter can be measured through known methods such as a measuring method using a mercury porosimeter.

In the honeycomb structure of the embodiments of the present invention, the main component of the constitution material of the honeycomb fired body is not limited to silicon carbide, and may be the following ceramics: nitride ceramics such as aluminum nitride, silicon nitride, boron nitride, and titanium nitride; carbide ceramics such as zirconium carbide, titanium carbide, tantalum carbide, and tungsten carbide; oxide ceramics such as alumina, zirconia, cordierite, mulite, aluminum titanate; and the like.

Non-oxide ceramics are preferable among these components, and silicon carbide or silicon-containing silicon carbide is particularly preferable. This is because they are excellent in thermal resistance, mechanical strength, thermal conductivity and the like.

A catalyst may be supported on the honeycomb structure of the embodiments of the present invention.

When a catalyst capable of converting harmful gaseous components such as CO, HC, and NOx in an exhaust gas is supported on the honeycomb structure, the harmful gaseous components in the exhaust gas can be converted sufficiently by catalytic reaction. Moreover, when a catalyst for assisting combustion of PMs is supported on the honeycomb structure, the PMs can be more easily burned and removed.

The honeycomb structure functioning as a honeycomb filter with cells sealed at either one end thereof is mentioned as the honeycomb structure of the embodiments of the present invention; however, in the honeycomb structure of the embodiments of the present invention, the cells are not necessarily sealed at an end thereof. This honeycomb structure of the embodiment of the present invention can be suitably used as a catalyst supporting carrier.

In the method for manufacturing the honeycomb structure of the embodiments of the present invention mentioned earlier, the method of assembling honeycomb fired bodies with an adhesive layer interposed therebetween is described; however, the manufacturing method of the ceramic block is not particularly limited. For example, the following method can be employed for preparing the ceramic block.

Firstly, a plurality of honeycomb fired bodies are placed in parallel with one another in columns and rows, with a spacer interposed therebetween, thereby preparing a parallel-arranged body of the honeycomb fired bodies whose cross section perpendicular to the longitudinal direction thereof has a shape almost the same as that of a ceramic block to be manufactured.

In this case, a gap corresponding to the thickness of the spacer is formed between the honeycomb fired bodies.

Successively, the parallel-arranged body of the honeycomb fired bodies is placed inside a filling apparatus including a tubiform with a substantially cylindrical shape and the like, and the gap formed between the honeycomb fired bodies and the gap formed between the parallel-arranged body and the tubiform are filled with a sealing material paste.

The filling apparatus is provided with the tubiform having a substantially cylindrical shape and the like and a sealing material paste supply device. The tubiform has an inner diameter slightly larger than the diameter of the parallel-arranged body of the honeycomb fired bodies to be disposed therein-side, and is so configured that a gap is formed between the tubiform and the parallel-arranged body of the honeycomb fired bodies when the parallel-arranged body is disposed in the inner space of the tubiform.

The sealing material paste supply device is so configured to allow simultaneously filling a space between the honeycomb fired bodies and a space between the tubiform and the parallel-arranged body with a sealing material paste accommodated in a sealing material paste container.

With the parallel-arranged body of the honeycomb fired bodies and the filling apparatus, the sealing material paste is filled into the space between the honeycomb fired bodies and the space between the tubiform and the parallel-arranged body. Successively, the sealing material paste is dried and solidified to simultaneously form an adhesive layer between the honeycomb fired bodies and a sealing material layer (coat layer).

Specifically, the above-mentioned method is a method including simultaneously carrying out combining in which a ceramic block is prepared and forming sealing material layer in which a sealing material layer is formed on the peripheral face of the ceramic block.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising:
    a ceramic block comprising:
        a plurality of honeycomb fired bodies each having cell walls extending along a longitudinal direction of the plurality of honeycomb fired bodies to define cells, the plurality of honeycomb fired bodies comprising:
            an assembly including a plurality of quadrangular-cross-section units which are combined with one another with an adhesive layer interposed between the plurality of quadrangular-cross-section units, the plurality of quadrangular-cross-section units each having a square shape or a rectangular shape in a cross section perpendicular to the longitudinal direction, a peripheral face of the assembly of the plurality of quadrangular-cross-section units having a concave portion and a convex portion formed in a step-shaped pattern;
            at least one triangular-cross-section unit having a right triangle shape in the cross section perpendicular to the longitudinal direction, the at least one triangular-cross-section unit being fit in the concave portion with the adhesive layer interposed between the at least one triangular-cross-section unit and the concave portion; and
            at least one trapezoidal-cross-section unit having a trapezoidal shape in the cross section perpendicular to the longitudinal direction, the trapezoidal shape including at least a first side, a second side forming a right angle with the first side, and an inclined line facing the right angle; and
        the adhesive layer being interposed between the plurality of honeycomb fired bodies to combine the plurality of honeycomb fired bodies; and
    a sealing material layer provided on a peripheral face of the ceramic block,
wherein
    the plurality of quadrangular-cross-section units include a first quadrangular-cross-section unit and a second quadrangular-cross-section unit,
    the concave portion includes a first side surface of the first quadrangular-cross-section unit and a second side surface of the second quadrangular-cross-section unit,
    the first side surface and a fourth side surface of the at least one triangular-cross-section unit contact each other with the adhesive layer interposed between the first side surface and the fourth side surface,
    the second side surface and a fifth side surface of the at least one triangular-cross-section unit contact each other with the adhesive layer interposed between the second side surface and the fifth side surface, and
    a sixth side surface of the at least one triangular-cross-section unit does not contact any of side surfaces of the quadrangular-cross-section unit,
wherein
    a seventh side surface of the at least one trapezoidal-cross-section unit including the inclined line forms the peripheral face of the ceramic block,
wherein
    an eighth side surface of the at least one trapezoidal-cross-section unit including the second side contacts the at least one triangular-cross-section unit with the adhesive layer interposed between the eighth side surface and the at least one triangular-cross-section unit,
wherein
    the honeycomb structure has a shape of a circle, a rounded rectangle, an ellipse, or a triangle whose apexes have a curved shape in the cross-section perpendicular to the longitudinal direction, and
wherein
    a shape of the ceramic block is a polygonal pillar.

2. The honeycomb structure according to claim 1, wherein
    each of the quadrangular-cross-section units has a square cross-sectional shape,
    the at least one triangular-cross-section unit has a right triangle cross-sectional shape corresponding to a shape obtained by equally dividing one of the quadrangular-cross-section units with a plain surface which includes diagonal lines of a first end face and a second end face of the one of the quadrangular-cross-section units, and
    the sixth side surface of the at least one triangular-cross-section unit includes a hypotenuse of a right triangle.

3. The honeycomb structure according to claim 1, wherein
    an outer wall is formed on a periphery portion of the at least one trapezoidal cross-section unit.

4. The honeycomb structure according to claim 1, wherein
    a ratio of a thickness of a thickest part of the sealing material layer to a thickness of a thinnest part of the sealing material layer is from about 20:about 1 to about 5:about 3.

5. The honeycomb structure according to claim 1, wherein a thickness of a thickest part of the sealing material layer is from about 5.0 mm to about 10.0 mm, and a thickness of a thinnest part of the sealing material layer is from about 0.5 mm to about 3.0 mm.

6. The honeycomb structure according to claim 1, wherein
a number of the plurality of honeycomb fired bodies is 25 pieces or more.

7. The honeycomb structure according to claim 1, wherein
the honeycomb structure has a round shape in the cross-section perpendicular to the longitudinal direction and has a diameter of about 190 mm or more.

8. The honeycomb structure according to claim 1, wherein
the ceramic block has a tricontadigonal shape in the cross-section perpendicular to the longitudinal direction.

9. The honeycomb structure according to claim 1, wherein
each of the cells has a quadrangular shape in the cross section perpendicular to the longitudinal direction.

10. The honeycomb structure according to claim 1, wherein
the cells comprise large-capacity cells and small-capacity cells, and
each of the large-capacity cells has an area larger than an area of each of the small-capacity cells in a cross section perpendicular to the longitudinal direction.

11. The honeycomb structure according to claim 10, wherein
each of the large-capacity cells has a quadrangular shape and each of the small-capacity cells has a quadrangular shape, in a cross section perpendicular to the longitudinal direction.

12. The honeycomb structure according to claim 10, wherein
each of the large-capacity cells has a octagonal shape and each of the small-capacity cells has a quadrangular shape, in a cross section perpendicular to the longitudinal direction.

13. The honeycomb structure according to claim 11, wherein,
each of the cells having a quadrangular shape in the cross section perpendicular to the longitudinal direction includes a circular-arc shape at least one portion equivalent to a corner of a quadrangle.

14. The honeycomb structure according to claim 10, wherein
each of the large-capacity cells and each of the small-capacity cells have a cross-section perpendicular to the longitudinal direction in which each side of the large-capacity cells and the small-capacity cells is formed by a curved line.

15. The honeycomb structure according to claim 1, wherein
each of the cells has a first end portion and a second end portion opposite to the first end portion in the longitudinal direction, and
each of the cells is sealed at one of the first end portion and the second end portion.

16. The honeycomb structure according to claim 1, wherein
the honeycomb structure has a shape of a rounded rectangle, an ellipse, or a triangle whose apexes have a curved shape in the cross-section perpendicular to the longitudinal direction, and
a longest line segment which passes through a center of each shape of the honeycomb structure among line segments which join two points on a periphery of each shape of the honeycomb structure has a length of about 190 mm or more.

17. The honeycomb structure according to claim 3, wherein
each of the quadrangular-cross-section units has the first end face and the second end face opposite to the first end face in the longitudinal direction,
a length of one side of the first end face and a length of one side of the second end face are from about 31.5 mm to about 38.7 mm, and
a length of each of the square-cross-section units in the longitudinal direction is from about 101.6 mm to about 381.6 mm.

18. The honeycomb structure according to claim 3, wherein
the at least one triangular-cross-section unit has an isosceles right triangle cross-sectional shape,
a length of two sides forming the fourth side surface and the fifth side surface, other than a hypotenuse of an isosceles right triangle, in the cross-sectional shape of the at least one triangular-cross-section unit is from about 31.5 mm to about 38.7 mm, and a length of the hypotenuse forming the sixth side surface is from about 40.9 mm to about 54.9 mm, and
a length of the at least one triangular-cross-section unit in the longitudinal direction is from about 101.6 mm to about 381.6 mm.

19. The honeycomb structure according to claim 1, wherein
a length of the first side is from about 12.0 mm to about 25.5 mm, a length of the second side is from about 49.8 mm to about 56.9 mm, and a length of a third side of the at least one trapezoidal cross-section unit is from about 3.6 mm to about 10.0 mm, in a cross-sectional shape of the at least one trapezoidal cross-section unit, and
a length of the at least one trapezoidal cross-section unit in the longitudinal direction is from about 101.6 mm to about 381.6 mm.

20. The honeycomb structure according to claim 1, wherein
the plurality of honeycomb fired bodies comprise thirteen pieces of the quadrangular-cross-section units, eight pieces of triangular-cross-section units, and eight pieces of trapezoidal cross-section units.

21. The honeycomb structure according to claim 1, wherein
a shape of the cross section perpendicular to the longitudinal direction of the ceramic block is a dodecagon.

22. The honeycomb structure according to claim 1, wherein
a proportion of an area occupied by the plurality of honeycomb fired bodies is from about 87% to about 93% in the cross section perpendicular to the longitudinal direction of the honeycomb structure.

23. The honeycomb structure according to claim 1, wherein
a main component of a constitution material of each of the plurality of honeycomb fired bodies comprises silicon carbide or silicon-containing silicon carbide.

24. The honeycomb structure according to claim 1, further comprising:
a catalyst supported on the honeycomb structure.

25. The honeycomb structure according to claim 1, wherein each of the cells has a first end portion and a second end portion opposite to the first end portion in the longitudinal direction, and each of the cells is not sealed at the first end portion and the second end portion.

* * * * *